(12) United States Patent
Li et al.

(10) Patent No.: US 10,814,606 B2
(45) Date of Patent: Oct. 27, 2020

(54) APPARATUS AND METHOD FOR 3D PRINTING

(71) Applicant: Sony Corporation, Tokyo (JP)

(72) Inventors: Ji Li, Beijing (CN); Zhihui Zhang, Beijing (CN)

(73) Assignee: SONY CORPORATION, Tokyo (JP)

( * ) Notice: Subject to any disclaimer, the term of this patent is extended or adjusted under 35 U.S.C. 154(b) by 259 days.

(21) Appl. No.: 15/485,864

(22) Filed: Apr. 12, 2017

(65) Prior Publication Data

US 2017/0308977 A1   Oct. 26, 2017

(30) Foreign Application Priority Data

Apr. 20, 2016  (CN) .......................... 2016 1 0248044

(51) Int. Cl.
| | |
|---|---|
| *B33Y 30/00* | (2015.01) |
| *G06F 16/583* | (2019.01) |
| *B29C 64/386* | (2017.01) |
| *B33Y 50/00* | (2015.01) |
| *G06K 9/00* | (2006.01) |
| *G06Q 50/18* | (2012.01) |
| *G06T 7/00* | (2017.01) |

(52) U.S. Cl.
CPC ............ *B33Y 30/00* (2014.12); *B29C 64/386* (2017.08); *B33Y 50/00* (2014.12); *G06F 16/5854* (2019.01); *G06K 9/00214* (2013.01); *G06Q 50/184* (2013.01); *G06T 7/0006* (2013.01); *G06T 2207/10028* (2013.01); *G06T 2207/30164* (2013.01); *G06T 2207/30168* (2013.01)

(58) Field of Classification Search
None
See application file for complete search history.

(56) References Cited

U.S. PATENT DOCUMENTS

| | | | |
|---|---|---|---|
| 9,547,940 B1 * | 1/2017 | Sun ....................... | G06T 19/006 |
| 2007/0031001 A1 * | 2/2007 | Hamanaka ......... | G06K 9/00248 |
| | | | 382/103 |

(Continued)

OTHER PUBLICATIONS

Gal, Ran, "Salient Geometric Features for Partial Shape Matching and Similarity", Jan. 1, 2006, ACM Transactions on Graphics, vol. 25, Issue 1, pp. 130-150. (Year: 2006).*

(Continued)

*Primary Examiner* — Chan S Park
*Assistant Examiner* — Elisa M Rice
(74) *Attorney, Agent, or Firm* — Xsensus, LLP

(57) ABSTRACT

This disclosure relates to an apparatus and a method for 3D printing. The 3D object detection apparatus includes one or more processing circuit configured to acquire a robust shape value of a 3D object; match the robust shape value of the 3D object with a robust shape value of a 3D sample in a 3D sample database; determine a robust design value of the 3D object based on a robust design value of the matched 3D sample; and detect the 3D object based on a result of the matching process for the robust shape value and the determined robust design value of the 3D object. With the apparatus and the method for 3D printing according to the disclosure, an owner, a designer and a manufacturer of a 3D model can protect the 3D model from infringing intellectual property.

20 Claims, 9 Drawing Sheets

(56) References Cited

U.S. PATENT DOCUMENTS

| | | | | |
|---|---|---|---|---|
| 2014/0058959 A1* | 2/2014 | Isbjornssund | ........... | G06F 21/10 |
| | | | | 705/310 |
| 2014/0201126 A1* | 7/2014 | Zadeh | .................... | G06K 9/627 |
| | | | | 706/52 |
| 2015/0278598 A1* | 10/2015 | Scott | .................. | G06K 9/00577 |
| | | | | 382/100 |
| 2018/0321658 A1* | 11/2018 | Whitmarsh | ............ | B33Y 50/00 |

OTHER PUBLICATIONS

Osada Robert , "Matching 3D Models with Shape Distributions", SMI '01 Proceedings of the International Conference on Shape Modeling and Applications, p. 154 (Year: 2001).*

* cited by examiner

| 3D sample | generate a feature point set | calculate a distance between feature point pairs | distribution probability corresponding to the distance |

APPARATUS AND METHOD FOR 3D PRINTING

CROSS-REFERENCE TO RELATED APPLICATIONS

This application claims the benefit and priority of Chinese Application No. 20161024 8044.5, filed on Apr. 20, 2016, the entire disclosure of which is incorporated herein by reference.

TECHNICAL FIELD

The present disclosure relates to the technical field of 3D printing, and in particular to a 3D object detection apparatus, a 3D object detection method, an apparatus for establishing a 3D sample database, a method for establishing a 3D sample database, a 3D printer and a 3D object recognition system.

BACKGROUND

The background information related to the disclosure is provided in this section, which is not necessarily conventional technology.

3D printing technology, which is also referred as AM (Additive Manufacturing) technology, rapid prototyping manufacturing technology or stereo lithography technology, is a technology for fabricating a 3D entity based on a 3D model file with the assistance of a computer. Different printing materials may be used in the 3D printing technology, for example, plastics, resin, ceramics and metal and the like. For a cheap 3D printer, a common printing material includes for example PLA (polylactic acid) or ABS (Acrylonitrile Butadiene Styrene). The 3D printing technology is applied to print a doll model, a prototype system, a large machinery, a vehicle or other body.

Since a patent related to 3D printing is expired and the cheap 3D printer occurs in recent years, the 3D printing technology is widely used. In addition to industrial use, it is possible that the 3D printer is used for home use. With the development of the 3D printing technology, a cheap 3D scanning device also occurs correspondingly. With a wide use of the 3D printing technology and 3D scanning technology, it becomes a new challenge how to perform intellectual property protection on a 3D model, for example, protection for a patent, copyright or a design patent. In an aspect, the 3D printer can easily reprint a pirated or fake 3D entity based on the existing 3D model file; in the other aspect, although there is no ready-made 3D model file, by using the 3D scanning technology, 3D scanning can still be performed on the existing 3D entity, and the 3D model file is reconstructed and then the pirated or fake 3D entity is generated by the 3D printer. In this case, it becomes very difficult for an owner, a designer and a manufacturer of a 3D model to hope to protect the 3D model from infringing intellectual property.

In the existing intellectual property protection technology, DRM (Digital Rights Management) is used to control use and distribution of digital content. The DRM technology is used to protect the digital content such as music, a film and an eBook. In the DRM technology, a user is asked to input authorization information via specific software and limited to access on a specific device and the like, or an unauthorized access is limited by encrypting the content. Hence, the DRM technology can merely be used to protect the distribution of the 3D model file than prevent reconstructing the 3D entity by using the 3D scanning technology.

Another technology applied to intellectual property protection for 3D printing is 3D watermark technology. With the 3D watermark technology, copyright information such as a watermark is embedded into the 3D entity by using different materials or using a fine structure different from other part of the 3D entity, and different materials or structures can be detected by using X ray or infrared or other method, and then the embedded watermark is identified. Similar to the conventional digital watermark technology, such 3D watermark technology is required to be embedded into the 3D entity, which is very complex.

Thus, it is a challenge in the field of 3D printing technology how to realize intellectual property protection for the 3D model without embedding the watermark into the 3D model entity. It is expected that an apparatus and a method for 3D printing are proposed in the disclosure to solve at least one of the above technical problems.

SUMMARY

This section provides a general summary of the present disclosure and is not a full disclosure of its full scope or all of its features.

It is an object of the present disclosure to provide a 3D object detection apparatus, a 3D object detection method, an apparatus for establishing a 3D sample database, a method for establishing a 3D sample database, a 3D printer and a 3D object recognition system so that an owner, a designer and a manufacturer of a 3D model can protect the 3D model from infringing intellectual property easily.

In an aspect of the present disclosure, a 3D object detection apparatus is provided, comprising one or more processing circuits configured to perform operations of: acquiring a robust shape value of the 3D object; matching the robust shape value of the 3D object with a robust shape value of a 3D sample in a 3D sample database, wherein the robust shape value of the 3D object comprises a robust feature of a integral 3D shape of the 3D object, and the robust shape value of the 3D sample comprises a robust feature of a integral 3D shape of the 3D sample; determining a robust design value of the 3D object based on a robust design value of the matched 3D sample in a case that the robust shape value of the 3D object matches the robust shape value of the 3D sample; and detecting the 3D object based on a result of the matching process for the robust shape value and the determined robust design value of the 3D object.

In another aspect of the present disclosure, a method for establishing a 3D sample database is provided, comprising: generating, based on a 3D sample, a robust shape value of the 3D sample and a robust design value of the 3D sample, wherein the robust shape value of the 3D sample comprises a robust feature of a integral 3D shape of the 3D sample, and the robust design value of the 3D sample comprises a robust feature of a 3D shape of a specific area of the 3D sample; generating a record of the 3D sample based on the 3D sample, the robust shape value of the 3D sample and the robust design value of the 3D sample; and storing the generated record into the 3D sample database.

In another aspect of the present disclosure, a 3D printer is provided, comprising: a receiver configured to receive a model file of a 3D object; and the 3D object detection apparatus according to any one of claims 1 to 12 configured to detect the 3D object based on the model file of the 3D object.

In another aspect of the present disclosure, a 3D object recognition system is provided, comprising: a 3D scanner configured to scan a 3D object to obtain a model file of the 3D object; and the 3D object detection apparatus according to any one of claims 1 to 12 configured to detect the 3D object based on the model file of the 3D object.

In another aspect of the present disclosure, an apparatus for establishing a 3D sample database to detect a 3D object is provided. The apparatus comprises one or more processing circuits configured to perform operations of: generating, based on a 3D sample, a robust shape value of the 3D sample and a robust design value of the 3D sample, wherein the robust shape value of the 3D sample comprises a robust feature of a integral 3D shape of the 3D sample, and the robust design value of the 3D sample comprises a robust feature of a 3D shape of a specific area of the 3D sample; generating a record of the 3D sample based on the 3D sample, the robust shape value of the 3D sample and the robust design value of the 3D sample; and storing the generated record into the 3D sample database.

In another aspect of the present disclosure, a 3D object detection method is provided, comprising: acquiring a robust shape value of the 3D object; matching the robust shape value of the 3D object with a robust shape value of a 3D sample in a 3D sample database, wherein the robust shape value of the 3D object comprises a robust feature of a integral 3D shape of the 3D object, and the robust shape value of the 3D sample comprises a robust feature of a integral 3D shape of the 3D sample; determining a robust design value of the 3D object based on a robust design value of the matched 3D sample in a case that the robust shape value of the 3D object matches the robust shape value of the 3D sample; and detecting the 3D object based on a result of the matching process for the robust shape value and the determined robust design value of the 3D object.

With the apparatus and method for 3D printing according to the present disclosure, the robust shape value and the robust design value can be generated based on the 3D sample, and the record of the 3D sample generated thereby is stored into the 3D sample database. In this way, an owner, a designer and a manufacturer of a 3D model can change all the 3D models for intellectual property protection into 3D samples, store these 3D samples into the database in form of record and maintain and manage. Furthermore, the robust shape value of the 3D object is matched with the robust shape value of the 3D sample when it is required to detect whether the 3D object is derived from the 3D sample database. The robust design value of the 3D sample will be matched with the robust design value of the 3D object if the robust shape value of the 3D object matches the robust shape value of the 3D sample, thus a result of detecting is determined. Since the robust design value includes the robust feature of the 3D shape of the specific area of the 3D sample, in this case, it can be determined whether the 3D object is derived from the 3D sample only based on the robust design value without embedding a watermark into the 3D entity, so that it becomes easier to perform intellectual property protection on the 3D sample in the 3D sample database. In addition, the robust feature is used in the present disclosure, hence, a result of feature matching is not affected by a shape error or change in size generated in 3D scanning, so that a result of the matching is very accurate.

A further applicable scope will become apparent based on the description provided herein. The description and specific examples in the overview are only for schematic purposes and are not intended to limit the scope of the present disclosure.

BRIEF DESCRIPTION OF THE DRAWINGS

The drawings described herein are only for schematic purposes of the selected embodiments rather than all possible implementation, and are not intended to limit the scope of the present disclosure. In the drawings.

Figure 1:
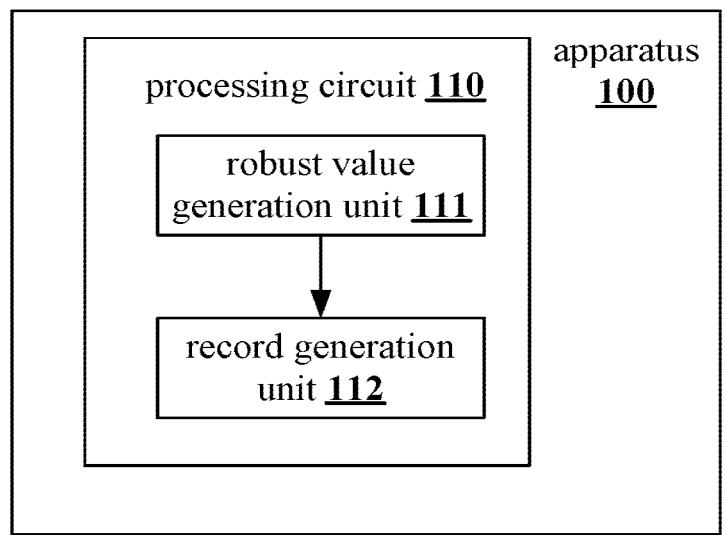
FIG. 1 is a block diagram of a structure of an apparatus for establishing a 3D sample database according to an embodiment of the present disclosure.

While the present disclosure is susceptible to various modifications and alternative forms, specific embodiments thereof have been shown by way of example in the drawings and are herein described in detail. It should be understood, however, that the description herein of specific embodiments is not intended to limit the present disclosure to the particular forms disclosed, but on the contrary, the intention of the present disclosure is to cover all modifications, equivalents, and alternatives falling within the spirit and scope of the present disclosure. Note that corresponding reference numerals indicate corresponding parts throughout the several views of the drawings.

DETAILED DESCRIPTION OF THE EMBODIMENTS

Examples of the present disclosure will now be described more fully with reference to the accompanying drawings. The following description is merely exemplary in nature and is not intended to limit the present disclosure, application, or usages.

Example embodiments are provided so that this disclosure will be thorough, and will fully convey the scope to those skilled in the art. Numerous specific details are set forth such as examples of specific components, devices, and methods, to provide a thorough understanding of embodiments of the present disclosure. It will be apparent to those skilled in the art that specific details need not be employed, that example embodiments may be implemented in many different forms and that neither should be construed to limit the scope of the disclosure. In some example embodiments, well-known processes, well-known structures, and well-known technologies are not described in detail.

In the disclosure, items "3D object", "3D entity", "3D sample" and "3D model" refer to real bodies having a three-dimensional structure, and items "3D model file" and "record of 3D sample" refer to a data file of the above real body having a three-dimensional, that is, the 3D printer can print a 3D entity corresponding to such data file by using 3D material once such data file is obtained.

As mentioned above, the 3D printer can reprint the pirate or fake 3D entity based on the existing 3D model file easily, or can perform 3D scanning on the existing 3D entity by using 3D scanning technology, reconstruct a 3D model file and then generate the pirate or fake 3D entity by the 3D printer. However, since the generated pirate or fake 3D entity is printed based on the reconstructed 3D model file, the structure will be necessarily different from the original 3D model, thus it is a great challenge how to detect the structure difference accurately and protect the intellectual property of the 3D model. Regarding to the above technical problems, the technical solution of the present disclosure is proposed.

First Embodiment

In the embodiment, an apparatus for establishing a 3D sample database is provided. FIG. 1 is a block diagram of a structure of an apparatus for establishing a 3D sample database according to an embodiment of the present disclosure.

As show in FIG. 1, an apparatus 100 includes a processing circuit 110. It is to be noted that, the apparatus 100 may include one processing circuit 110, or may include multiple processing circuits 110.

Furthermore, the processing circuit 110 may include various discrete functional units for performing various functions and/or operations. It is to be noted that, these functional units may be physical entities or logical entities, and the units with different names may be implemented as the same one physical entity.

For example, as shown in FIG. 1, the processing circuit 110 may include a robust value generation unit 111 and a record generation unit 112.

According to an embodiment of the present disclosure, the robust value generation unit 111 can generate a robust shape value of a 3D sample and a robust design value of the 3D sample based on the 3D sample. Furthermore, the robust value generation unit 111 can transmit the generated robust shape value of the 3D sample and the generated robust design value of the 3D sample to the record generation unit 112.

In an embodiment of the present disclosure, the robust shape value of the 3D sample includes a robust feature of a integral 3D shape of the 3D sample, and the robust design value of the 3D sample includes a robust feature of a 3D shape of a specific area of the 3D sample. According to an embodiment of the present disclosure, the specific area of the 3D sample may be a specific area on the 3D sample which is defined according to actual requirements by an owner, a designer and a manufacturer of the 3D sample, such as a specific area including a trademark, a specific area in a special shape, or a specific area representing characteristics of the 3D sample.

According to an embodiment of the present disclosure, the record generation unit 112 can generate a record of the 3D sample based on the 3D sample, the robust shape value of the 3D sample and the robust design value of the 3D sample. Here, the record generation unit can acquire the robust shape value of the 3D sample and the robust design value of the 3D sample from the robust value generation unit 111. Furthermore, the record generation unit 112 can store the generated record into the 3D sample database.

It can be seen that, according to the above embodiment of the present disclosure, the apparatus 100 for establishing the 3D sample database can generate the record of the 3D sample based on the 3D sample, the robust shape value of the 3D sample and the robust design value of the 3D sample. In this case, 3D samples stored in the 3D sample database all have unique feature data, and data in the records of two 3D samples having similar appearance is different, which is convenient for storing and managing the 3D samples. Furthermore, when detecting other 3D object subsequently, it can be more easily determined the difference between the 3D object and the 3D sample in the 3D sample database, thereby achieving the intellectual property protection for the 3D sample.

Figure 2:
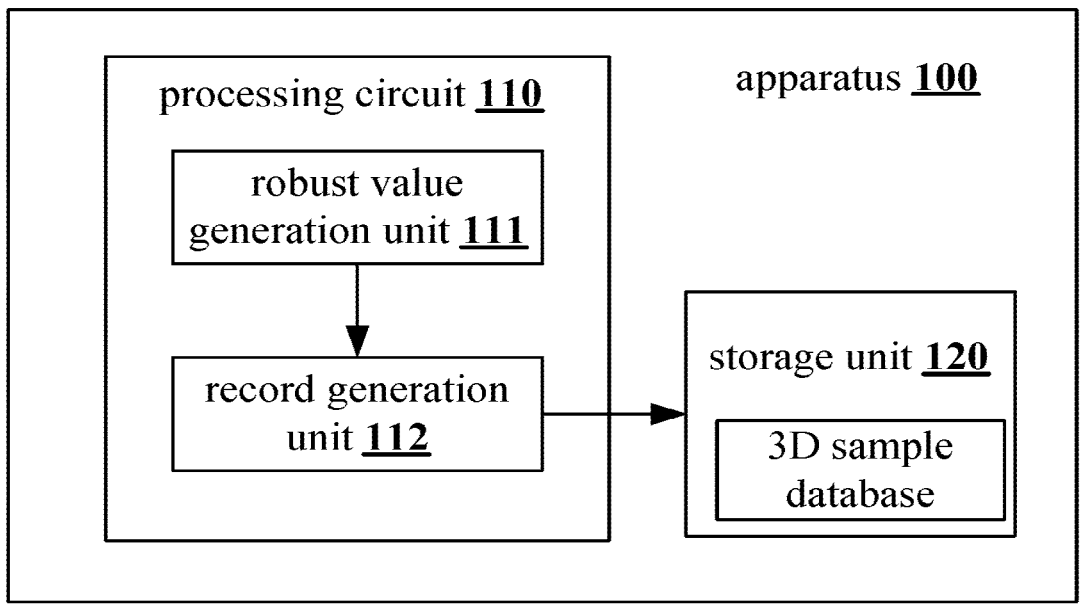
FIG. 2 is a block diagram of a structure of an apparatus for establishing a 3D sample database according to a further embodiment of the present disclosure.

FIG. 2 is a block diagram of a structure of a further apparatus for establishing the 3D sample database according to an embodiment of the present disclosure. In FIG. 2, the apparatus 100 for establishing the 3D sample database further includes a storage unit 120 for storing the 3D sample database. In the embodiment, the record generation unit 112 transmits the generated record of the 3D sample to the storage unit 120 to store into the 3D sample database. According to an embodiment of the present disclosure, the apparatus 100 not only can establish the 3D sample database, but also can store the 3D sample database, thus the 3D sample database in the apparatus 100 can be protected by only performing operations such as encrypting on the apparatus 100. However, when the records of the 3D samples gradually increase, a storage capacity of the apparatus 100 may be limited and can not bear a large amount of records of the 3D samples.

According to the above embodiment of the present disclosure, the apparatus 100 as shown in FIG. 2 may further include a communication unit (not shown in FIG. 2) for acquiring model data of the 3D sample, and then the robust value generation unit 111 can generate the robust shape value of the 3D sample and the robust design value of the 3D sample based on the model data of the 3D sample. Furthermore, the communication unit can further transmit information in the record of the 3D sample in the 3D sample database to other device or apparatus so that other device or apparatus detects other 3D object based on the information in the records of the 3D samples in the 3D sample database, of which the content will be described in detail in the following embodiment.

Figure 3:
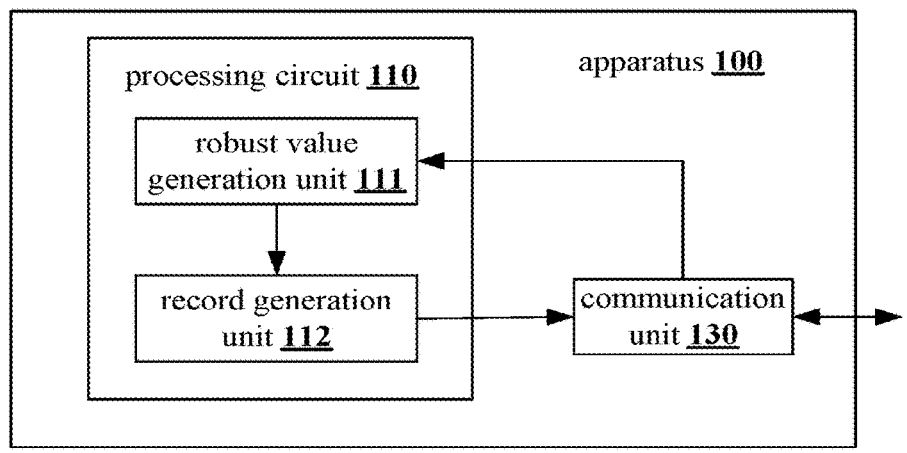
FIG. 3 is a block diagram of a structure of an apparatus for establishing a 3D sample database according to a further embodiment of the present disclosure.

FIG. 3 is a block diagram of a structure of a further apparatus for establishing a 3D sample database according to an embodiment of the present disclosure. In FIG. 3, the apparatus 100 may further include a communication unit 130 for transmitting the generated record in order to store the record into the 3D sample database. In the embodiment, the 3D sample database is located in other apparatus different from the apparatus 100, thus the communication unit 130 can transmit the record to the 3D sample database via a network after the record generation unit generates the record of the 3D sample. According to an embodiment of the present disclosure, the apparatus 100 is only used to establish the 3D sample database rather than storing the 3D sample database so that the 3D sample database is stored and maintained by a dedicate apparatus, so that the 3D sample database can be managed better and the apparatus 100 can be miniaturized and portable. However, in the embodiment, the 3D sample in the 3D sample database can be protected by encrypting both the apparatus 100 and the 3D sample database.

Next, it will be described, in conjunction with FIGS. 4 and 5, how the robust value generation unit 111 generates the robust shape value and the robust design value of the 3D sample.

According to an embodiment of the present disclosure, the robust value generation unit 111 may include a feature point determination unit, a robust feature determination unit and a quantizing unit.

According to an embodiment of the present disclosure, the feature point determination unit can determine a feature point of the 3D sample and a feature point of a specific area of the 3D sample.

The robust feature determination unit may determine a robust shape feature of the 3D sample based on a feature point of the 3D sample, and may determine a robust design feature of the 3D sample based on a feature point of the specific area of the 3D sample. Here, the robust shape feature of the 3D sample may indicate a robust feature of a integral 3D shape of the 3D sample, and the robust design feature of the 3D sample may indicate a robust feature of a 3D shape of a specific area of the 3D sample. According to an embodiment of the present disclosure, the robust feature determination unit may generate the robust feature of the 3D sample based on any method or algorithm well known in the art. For example, the robust feature generation unit may generate the robust feature of the 3D sample by using the 3D SURF (Speed Up Robust Feature), the Harris 3D feature, the intrinsic Shape Signatures or the D2 Shape feature algorithm.

The quantizing unit can quantize the robust shape value of the 3D sample to generate the robust shape value of the 3D sample, and can quantize the robust design feature of the 3D sample to generate the robust design value of the 3D sample. According to an embodiment of the present disclosure, quantizing the robust feature may include vector quantization of the robust feature.

According to an embodiment of the present disclosure, the robust value may be represented by a hash value. That is, the robust shape value of the 3D sample may include a robust shape hash value of the 3D sample, and the robust design value of the 3D sample may include a robust design hash value of the 3D sample.

According to an embodiment of the present disclosure, the quantizing unit may quantize each dimension vector of each feature point to one or more bits. When each dimension vector of each feature point is quantized to one bit, firstly the feature points are clustered; then each dimension in each cluster is averaged respectively; each dimension vector of each feature point is quantized to 1 in a case the vector is greater than the average value, otherwise, the vector is quantized to 0. When each dimension vector of each feature point is quantized to multiple bits, firstly, the feature points are clustered; then each dimension vector in each cluster is averaged, multiple quantizing intervals are set based on the average value, and each interval corresponds to binary values of multiple bits. Each dimension vector of each feature point is quantized to multiple bits in a certain quantizing interval in a case that the dimension vector falls within the interval. The more the quantizing intervals are, the higher the accuracy of the matching the feature point is, but the longer the length of final hash value is.

Generation of Robust Shape Value

According to an embodiment of the present disclosure, the robust value generation unit may generate the robust shape value of the 3D sample using a global feature of the 3D sample, or may generate the robust shape value of the 3D sample using a local feature of the 3D sample.

Use of Global Feature

Figure 4:
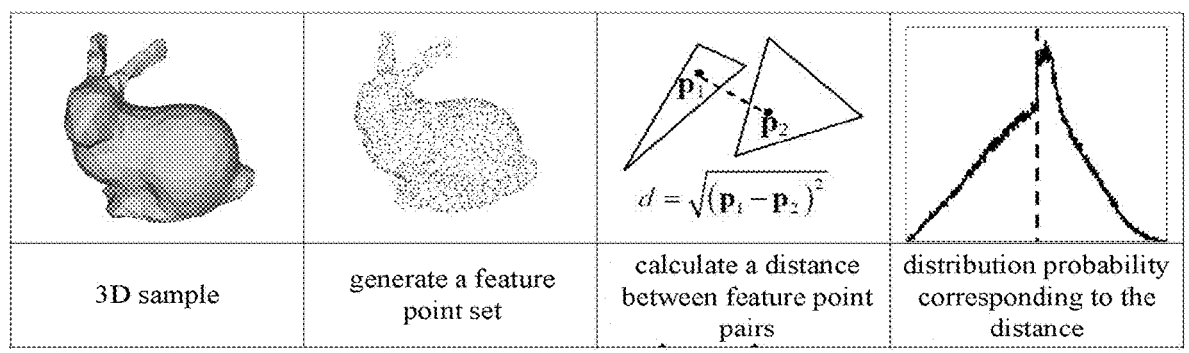
FIG. 4 is a schematic diagram of a process of generating a robust shape value of a 3D sample using a global feature of the 3D sample.

FIG. 4 is a schematic diagram of a process of generating a robust shape value of a 3D sample using a global feature of the 3D sample. In FIG. 4, a famous model "Stanford Bunny" (http://graphics.stanford.edu/data/3Dscanrep/) is taken as an example to describe a process of generating the robust shape value using the global feature, and for example, the method for generating the robust shape value of the 3D sample using the global feature of the 3D sample may use a method in reference document 1 (Ryutarou Ohbuchi, Takahiro Minamitani, Tsuyoshi Takei, Shape-similarity search of 3D models by using enhanced shape functions, International Journal of Computer Applications in Technology (IJCAT), pp. 70-85, Vol. 23, No. 2/3/4, 2005).

As shown in FIG. 4, firstly, the feature point determination unit may determine, as a feature point set, a feature point of the 3D sample based on the global feature of the 3D sample. Here, the feature point set of the 3D sample may be generated based on the global feature of the 3D sample by using any method well known in the art. The disclosure hereinafter provides only one example, and this is not intended to limiting.

Firstly, a surface of the 3D sample is divided into multiple triangular surfaces; secondly, a total area of all the triangular surfaces is calculated, and a proportion of an area of each triangular surface in the total area is considered as selection probability of the triangular surface; next, a triangular surface is selected based on the selection probability of the triangular surface, N feature points are selected in all (N may be defined according to actual requirements), the number of selecting a triangular surface X is N×q in a case that a proportion of an area of the triangular surface X in the total area is q; next, in any one of the selected triangular surfaces (a vertex coordinate of the triangular surface is (A, B, C)), a position P in the triangular surface is selected as a feature point according to the following formula (1), where $r_1$ and $r_2$ are random numbers in [0, 1] interval.

$$P=(1-\sqrt{r_1})A+\sqrt{r_1}(1-\sqrt{r_2})B+\sqrt{r_1}r_2C \quad (1)$$

After the feature point determination unit determines the feature point set of the 3D sample, next, as shown in FIG. 4, the robust feature determination unit can determine a robust shape feature of the 3D sample based on the feature points of the 3D sample. Firstly, the robust feature determination unit calculates a distance between any two of the selected N feature points (that is, between the feature point pairs). Next, a distribution function of the distance is calculated. A point on the x-axis represents a distance value between the feature points, and a point on the y-axis represents a distribution probability corresponding to a certain distance value, which is a proportion of the distance value in all the distance values. Next, a multi-dimension vector obtained by sampling the distribution function and calculating a histogram thereof is taken as the robust shape feature of the 3D sample. A dimension of the vector is equal to a sampling number of sampling the distribution, and a value of each dimension is equal to a average value of probabilities falling within the sampling interval.

After the robust feature determination unit determines the robust shape feature of the 3D sample, the quantizing unit can determine the robust shape value of the 3D sample, such as a robust shape hash value including multiple bits.

According to the above embodiment of the present disclosure, the robust value generation unit generates the robust shape value of the 3D sample using the global feature of the 3D sample.

The robust feature here is calculated based on a random point on the surface of the 3D sample, with invariance of various transformations under random sampling, such as invariance relative to rigid motion and mirror transformation; meanwhile the random sampling allows that a final robust feature has robustness in response to subtle disturbance, such as the added random noise, small bump change on the surface, crack and the like. In addition, the robust feature here also has robustness under scale transformation, that is, the robust feature is invariant or has little change in a case that the 3D sample is zoomed in or zoomed out. The accuracy of robustness and feature matching is related to parameter selection. The more the number of the selected random points and sampling density are, the higher accuracy of the matching the finally calculated feature is, the lower the corresponding robustness is; otherwise the robustness is higher. In practice, selection of a specific parameter is determined by an experiment.

Use of Local Feature

Figure 5:
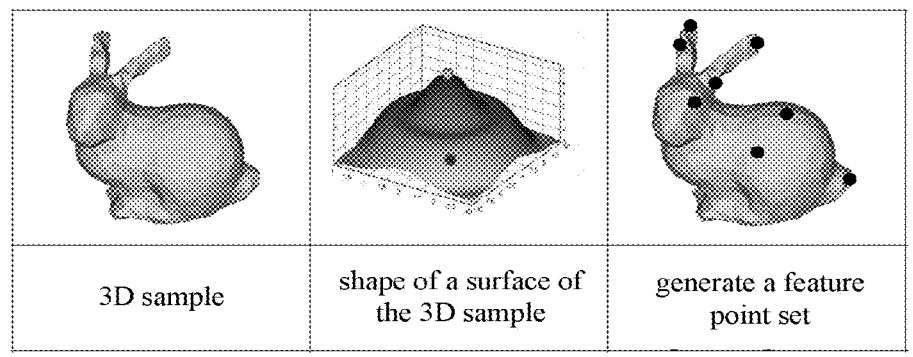
FIG. 5 is a schematic diagram of a process of generating a robust shape value of a 3D sample using a local feature of the 3D sample.

FIG. 5 is a schematic diagram of a process of generating a robust shape value of a 3D sample using a local feature of the 3D sample. In FIG. 5, the famous "Stanford Bunny" model is still taken as an example to describe a process of generating the robust shape value using the local feature.

As shown in FIG. 5, firstly, the feature point determination unit may determine, as a feature point set, a feature point of the 3D sample based on a local feature of the 3D sample. Here, the feature point set of the 3D sample may be generated based on the local feature of the 3D sample by using any method well known in the art. The disclosure hereinafter provides only one example, and this is not intended to limiting.

In this example, the feature point determination unit may select the feature points from vertexes of a shape of a surface of the 3D sample. The middle diagram in FIG. 5 shows a part of a shape of the 3D sample, the highest point in this part representing a vertex of the shape of the surface of the 3D sample. The feature point determination unit may determine all the vertexes of the shape of the surface of the 3D sample, calculate a feature point value based on a normal vector of each vertex and a normal vector of a neighbor point for each vertex, and select a corner point which is a vertex having the local maximum feature point value as the feature point. The right diagram in FIG. 5 shows the feature point set of the 3D sample, each block filled dot representing a feature point.

After the feature point determination unit determines the feature point set of the 3D sample, next, the robust feature determination unit may determine the robust shape feature of the 3D sample based on the feature points of the 3D sample. In the following, a nonrestrictive example is given. The robust feature determination unit calculates a SURF feature value for each feature point and takes the generated feature value set as the 3D robust shape feature. Each SURF feature is a multi-dimension vector.

After the robust feature determination unit determines the robust shape feature of the 3D sample, a quantizing unit may determine the robust shape value of the 3D sample, such as a robust shape hash value including multiple bits.

According to the above embodiment of the present disclosure, the robust value generation unit generates the robust shape value of the 3D sample using a local feature of the 3D sample.

The 3D robust feature here has robustness under transformation operation, such as a non-rigid transformation, topic transformation, a local or global scale transformation, additive noise, a hole on surface, shot noise, or down sampling.

It is to be noted that, although the method for generating the robust shape value using the global feature and the local feature is described as above, a method for calculating the 3D robust shape value is not limited to this, a method can be applied as long as the calculated feature has robustness required for the application, for example, various change which may be brought in 3D scanning and printing such as the scale transformation of the 3D shape, noise, slight change on surface, crack, or hole.

Generation of Robust Design Value

According to an embodiment of the present disclosure, the robust value generation unit may generate a robust design value of a 3D sample using a global feature of a specific area of the 3D sample, or may generate a robust design value of a 3D sample using a local feature of a specific area of the 3D sample.

Use of Global Feature

The method for generating the robust design value of the 3D sample using a global feature is similar to the method for generating the robust shape value of the 3D sample using a global feature. The unique difference is that the global feature here refers to the global feature of the specific area. In other word, firstly, the feature point determination unit may determine, as a feature point set, feature points of the specific area of the 3D sample based on the global feature of the specific area of the 3D sample. After the feature point determination unit determines the feature point set of the specific area of the 3D sample, next, the robust feature determination unit may determine the robust design feature of the 3D sample based on the feature points of the specific area of the 3D sample. After the robust feature determination unit determines the robust design feature of the 3D sample, the quantizing unit may determine the robust design value of the 3D sample, such as the robust shape hash value including multiple bits.

Use of Local Feature

The method for generating the robust design value of the 3D sample using a local feature is similar to the method for generating the robust shape value of the 3D sample using a local feature. The unique difference is that the local feature here refers to the local feature of the specific area. In other word, firstly, the feature point determination unit may determine, as a feature point set, feature points of the specific area of the 3D sample based on the local feature of the specific area of the 3D sample. For example, the feature point determination unit may select feature points from vertexes of a shape of a surface of the specific area of the 3D sample. After the feature point determination unit determines the feature point set of the specific area of the 3D sample, next, the robust feature determination unit may determine the robust design feature of the 3D sample based on the feature points of the specific area of the 3D sample. After the robust feature determination unit determines the robust design feature of the 3D sample, the quantizing unit may determine the robust design value of the 3D sample, such as the robust design hash value including multiple bits.

Next, a specific operation of the robust value generation unit 111 is described in conjunction with FIGS. 6 to 9.

Figure 6:
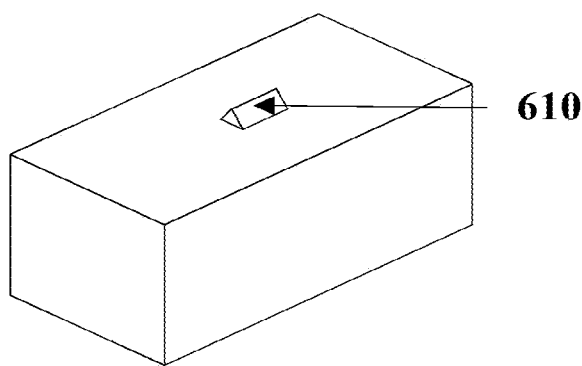
FIG. 6 is an example of a 3D sample according to an embodiment of the present disclosure.

FIG. 6 is an example of a 3D sample according to an embodiment of the present disclosure. As shown in FIG. 6, the 3D sample consists of a cuboid and a triangular prism 610 in general. The triangular prism 610 is an area in a special shape on the 3D sample, or carries a trademark on the triangular prism 610, or represents characteristics of the 3D sample. In this case, an owner, a designer or a manufacturer of the 3D sample may define the triangular prism 610 as a specific area of the 3D sample. It is to be noted that, in the example as shown in FIG. 6, for a purpose of illustration, an example of the 3D sample is given schematically. In practice, a shape and a specific area of the 3D sample are more complex than thereof this example.

Figure 7:
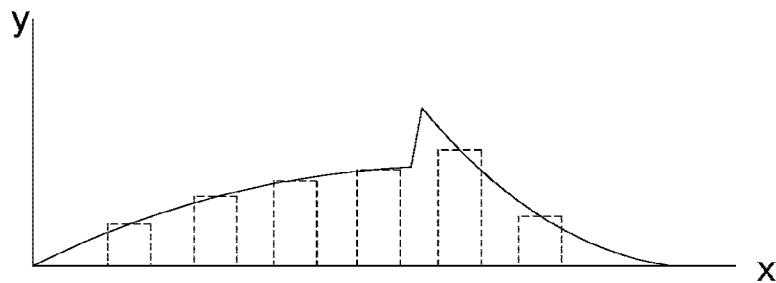
FIG. 7 is a schematic diagram of a process of generating a robust feature in the example as shown in FIG. 6.

FIG. 7 is a schematic diagram of a robust feature of the example as shown in FIG. 6. Here, the robust shape feature of the example as shown in FIG. 6 is generated using the global feature. As shown in FIG. 7, the x-axis represents a distance value between feature points of the 3D sample as shown in FIG. 6, and the y-axis represents a distribution function of distance. A multi-dimension vector obtained by sampling such distribution function and calculating a histogram thereof as the robust shape feature of the 3D sample as shown in FIG. 6.

Figure 8:
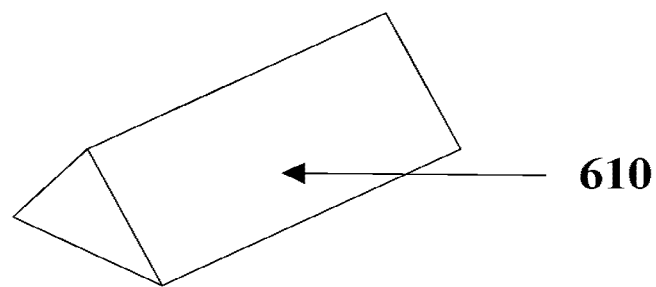
FIG. 8 is an example of a specific area in the example as shown in FIG. 6.
Figure 9:
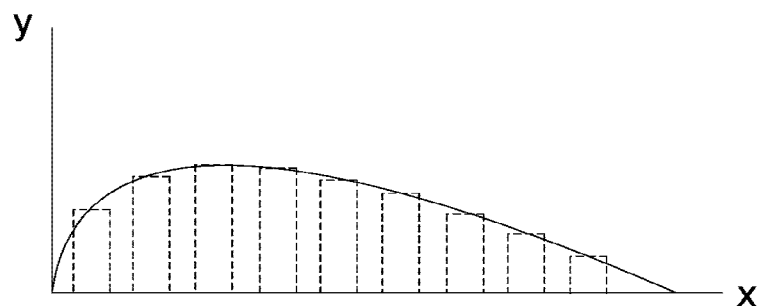
FIG. 9 is a schematic diagram of a process of generating a robust feature in the example as shown in FIG. 8.

FIG. 8 is an example of a specific area of the example as shown in FIG. 6. FIG. 9 is a schematic diagram of an example of generating a robust feature of the example as shown in FIG. 8. Here, the robust shape feature of the example as shown in FIG. 8 is generated using the global feature. As shown in FIG. 9, the x-axis represents a distance value between feature points of the specific area of the 3D sample as shown in FIG. 8, and the y-axis represents a distribution of a distance. A multi-vector obtained by sampling the distribution function and calculating a histogram thereof as the robust feature of a specific area of the 3D feature as shown in FIG. 8, which is the robust design feature of the 3D sample as shown in FIG. 6.

According to an embodiment of the present disclosure, the record generation unit 112 may generate a record of the 3D sample based on the 3D sample, the robust shape value of the 3D sample and the robust design value of the 3D sample.

According to an embodiment of the present disclosure, in addition to the above parameters, the recording generation unit 112 may further generate the record of the 3D sample based on the robust shape feature of the 3D sample and the robust design feature of the 3D sample.

Next, an example of a record stored in a 3D sample database is given, but those skilled in the art should understand that, such example is not limiting, a manager and a maintainer of the 3D sample database may further store the record of the 3D sample in other form according to actual requirements.

TABLE 1 storage example of 3D sample database

| attri-bute name | robust shape value | robust shape feature | robust design value | robust design feature | description information | intellectual property information | 3D model file |
|---|---|---|---|---|---|---|---|
| data type | value type | object | value type | object | text | text | file |

In the above-described table, each line represents one record in the 3D sample database. For each record, the robust shape feature, the robust design feature, the robust shape value and the robust design value are described in the above. Here, the description information includes a shape description of the 3D sample, a shape description of the specific area, and description of a position of a specific area relative to the 3D sample; the intellectual information here includes information on the 3D sample and the specific area, such as a design patent, an utility model patent, registration information of a trademark and the like; the 3D model file refers to the 3D sample. The 3D sample database includes multiple such records.

In the embodiment as stated above, the apparatus 100 for establishing the 3D sample database is provided, which can generate the record of the 3D sample based on the 3D sample, the robust shape value of the 3D sample and the robust design value of the 3D sample, which is convenient for storing and managing the 3D sample.

Second Embodiment

Figure 10:
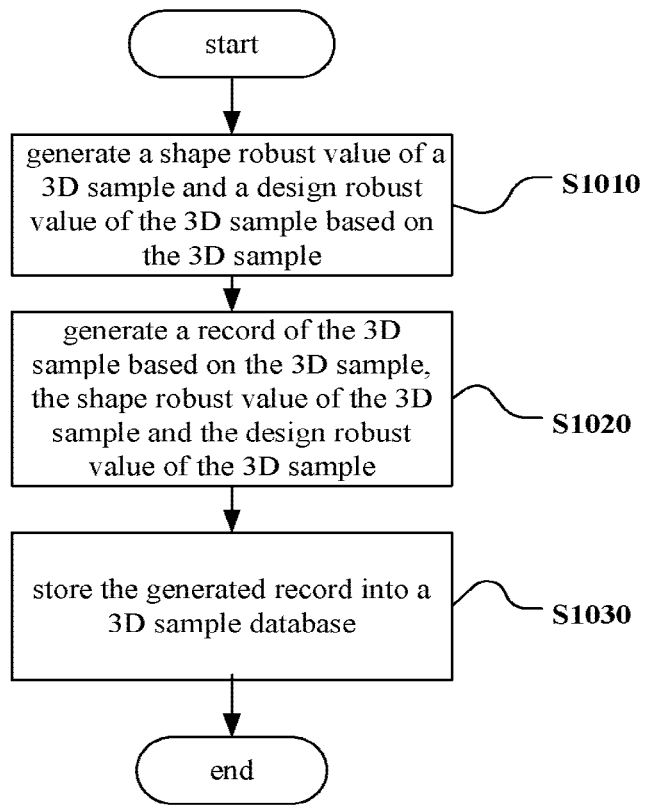
FIG. 10 is a flowchart of a method for establishing a 3D sample database according to an embodiment of the present disclosure.

In this embodiment, a method for establishing a 3D sample database is provided. FIG. 10 is a flowchart of a method for establishing a 3D sample database according to an embodiment of the present disclosure.

As shown in FIG. 10, firstly, in step S1010, a robust shape value of a 3D sample and a robust design value of the 3D sample are generated based on the 3D sample. According to an embodiment of the present disclosure, the robust shape value of the 3D sample includes a robust feature of a integral 3D shape of the 3D sample, and the robust design value of the 3D sample includes a robust feature of a 3D shape of a specific area of the 3D sample.

Next, in step S1020, a record of the 3D sample is generated based on the 3D sample, the robust shape value of the 3D sample and the robust design value of the 3D sample.

Next, in step S1030, the generated record is stored into the 3D sample database.

Preferably, the step of storing the generated record into the 3D sample database may include storing the generated record into a local 3D sample database.

Preferably, the step of storing the generated record into the 3D sample database may include storing the generated record into the 3D sample database via a network.

Preferably, the robust shape value of the 3D sample may be generated using a global feature of the 3D sample.

Preferably, the robust shape value of the 3D sample may be generated using a local feature of the 3D sample.

Preferably, the robust design value of the 3D sample may be generated using a global feature of a specific area of the 3D sample.

Preferably, the robust design value of the 3D sample may be generated using a local feature of a specific area of the 3D sample.

In this embodiment, the apparatus for performing the method for establishing the 3D sample database may be the apparatus 100 in the first embodiment, hence, all the various embodiments described in the first embodiment are applied hereto. That is, various specific embodiments of each of the above-described steps of the method for establishing the 3D sample database according to an embodiment of the present disclosure have been described in detail with respect to the apparatus 100 for establishing the 3D sample database described above, which is not described repeatedly here.

Third Embodiment

Figure 11:
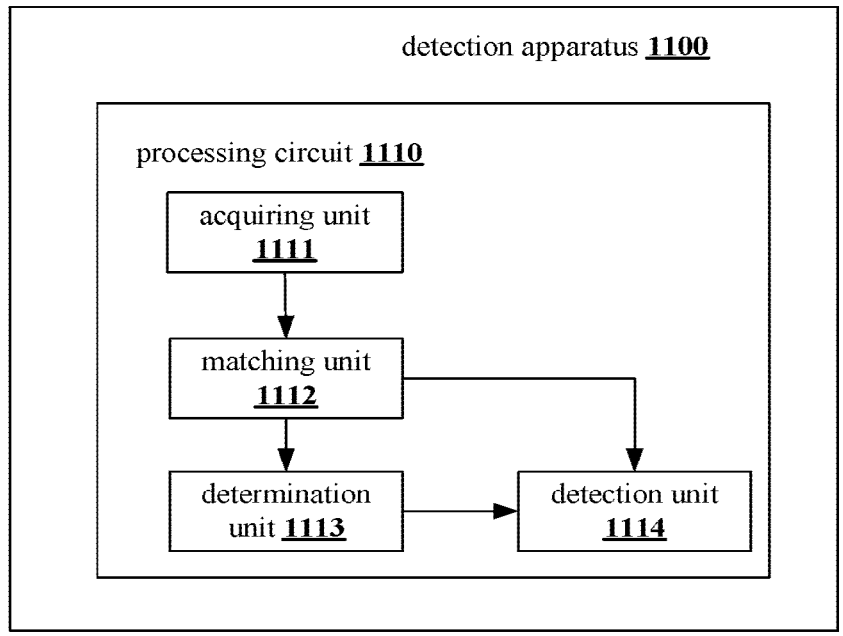
FIG. 11 is a block diagram of a structure of a 3D object detection apparatus according to an embodiment of the present disclosure.

A 3D object detection apparatus is provided according to an embodiment. FIG. 11 is a block diagram of a structure of a 3D object detection apparatus according to an embodiment of the present disclosure.

As shown in FIG. 11, an apparatus 1100 includes a processing circuit 1110. It is to be noted that, the apparatus 1100 may include one processing circuit 1110, or may include multiple processing circuits 1110.

Furthermore, the processing circuit 1110 may include various discrete functional units for performing various functions and/or operations. It is to be noted that, these functional units may be physical entities or logical entities, and the units with different names may be implemented as the same one physical entity.

For example, as shown in FIG. 11, the processing circuit 1110 may include an acquiring unit 1111, a matching unit 1112, a determination unit 1113 and a detection unit 1114.

According to an embodiment of the present disclosure, the acquiring unit 1111 may acquire a robust shape value of the 3D object. According to an embodiment of the present disclosure, the acquiring unit 1111 may acquire the robust shape value of the 3D object in various ways. In an embodiment, the acquiring unit 1111 may acquire a model file of the 3D object and then calculate the robust shape value of the 3D object based on the model file of the 3D object. In another embodiment, the acquiring unit 1111 may acquire the robust shape value of the 3D object from other apparatus or other unit of the apparatus 1100 directly. In the present disclosure, there is no essential difference between the 3D object and the 3D sample as stated above, both of which represent a 3D entity with a three-dimension structure. Only for distinguishing, the 3D entity corresponding to the record stored in the 3D sample database is referred as a 3D sample, and a 3D entity to be detected is referred as a 3D object. Furthermore, in the disclosure, a method for defining and calculating the robust shape value of the 3D object may be the same as the method for defining and calculating the robust shape value of the 3D sample as stated above. That is, the robust shape value of the 3D object includes the robust feature of the integral 3D shape of the 3D object.

According to an embodiment disclosure, in a case that the acquiring unit 1111 acquires the model file of the 3D object and then calculates the robust shape value of the 3D object based on the model file of the 3D object, the acquiring unit 1111 may include a feature point determination unit, a robust feature determination unit and a quantizing unit (not shown). The feature point determination unit may determine feature points of the 3D object based on the model file of the 3D object. The robust feature determination unit may determine the robust shape feature of the 3D object based on the feature points of the 3D object. The quantizing unit may quantize the robust shape feature of the 3D object to generate the robust shape value of the 3D object. According to an embodiment of the present disclosure, the robust value may be represented by a hash value. That is, the robust shape value of the 3D object may include a robust shape hash value of the 3D object.

According to an embodiment of the present disclosure, the robust shape value of the 3D object may be generated using a global feature of the 3D object, or may be generated using a local feature of the 3D object.

Various embodiments of the robust value generation unit 111 in the apparatus 100 as stated above with regarding to generation of the robust shape value of the 3D sample are all applicable to generation of the robust shape value of the 3D object, which is not described repeatedly here.

Furthermore, the acquiring unit 1111 may transmit the obtained robust shape value of the 3D object to the matching unit 1112.

According to an embodiment of the present disclosure, the matching unit 1112 may match the robust shape value of the 3D object with the robust shape value of the 3D sample in the 3D sample database. Here, the robust shape value of the 3D sample includes the robust feature of the integral 3D shape of the 3D sample. According to an embodiment of the present disclosure, the matching unit 1112 may acquire the robust shape value of the 3D object from the acquiring unit 1111. Here, the 3D sample database may be the 3D sample database established by the apparatus 100 as stated above, the matching unit 1112 may acquire the robust shape values of all the 3D samples from the 3D sample database and match the robust shape value of the 3D object with the robust shape values of all the 3D samples. Thus, the matching unit 1112 can determine a result of the matching. The result of the matching includes the result of the matching being positive, which indicates that the robust shape value of the 3D object matches a 3D sample in the 3D sample database; or the result of the matching being negative, which indicates that the robust shape value of the 3D object matches none of the 3D samples in the 3D sample database.

According to an embodiment, the determination unit 1113 may determine a robust design value of the 3D object based on the robust design value of the matched 3D sample in a case that the robust shape value of the 3D object matches the robust shape value of the 3D sample. Here, in a case that the matching unit 1112 determines that the robust shape value of the 3D object matches a robust shape value of a 3D sample in the 3D sample database, the matching unit 1112 may further transmit related information of the matched 3D sample to the determination unit 1113, such as a number and a model file of the 3D sample. The determination unit 1113 may acquire the robust design value of the matched 3D sample from the 3D sample database, and determine a robust design of the 3D object based on this robust design value.

Furthermore, the determination unit 1113 may transmit the robust design value of the 3D object to the detection unit 1114.

According to an embodiment, the detection unit 1114 may detect the 3D object based on a result of the matching the robust shape value and the determined robust design value of the 3D object from the determination unit 1113. According to an embodiment of the present disclosure, the detection unit 1114 may detect the 3D object based on the result of the matching the robust shape value and the robust design value of the 3D object.

As described above, according to an embodiment of the present disclosure, for detecting the 3D object, the robust shape value of the 3D object may be matched with the robust shape value of the 3D sample in the 3D sample database. A robust design value of the 3D object is determined based on the matched 3D sample and a result of detection is determined based on the robust design value of the 3D object, if the robust shape value of the 3D object matches the robust shape value of the 3D sample in the 3D sample database. Since the robust design value of the 3D sample includes a robust feature of a 3D shape of a specific area of the 3D sample, in this case, the 3D object can be detected only based on the robust design value of the 3D object without embedding a watermark into the 3D sample, thereby performing intellectual property protection on the 3D sample in the 3D sample database becomes easier.

According to an embodiment of the present disclosure, the matching unit 1112 may include a calculation unit and a judging unit (not shown).

According to an embodiment of the present disclosure, the calculation unit may calculate a Hamming distance between the robust shape value of the 3D object and the robust shape value of the 3D sample. As mentioned above, the robust shape value may include a robust shape hash value, that is, the robust shape value includes multiple bits. The Hamming distance is a parameter for comparing two character strings well known in the art and indicates the number of different bits in two character strings with the same length. According to an embodiment of the present disclosure, the calculation unit may perform exclusive-or operation on the robust shape value of the 3D object and the robust shape value of each 3D sample in the 3D sample database, and take the number of bits being 1 in the result as the Hamming distance between the robust shape value of the 3D object and the robust shape value of the 3D sample. In this way, the calculation unit may calculate a Hamming distance between the robust shape value of the 3D object and the robust shape value of each 3D sample, and transmit these Hamming distances to the judging unit.

According to an embodiment of the present disclosure, the judging unit may determine whether the robust shape value of the 3D object matches the robust shape value of the 3D sample based on a result of comparing the Hamming distance and a predetermined threshold value. Specifically, the judging unit determines that the robust shape value of the 3D object matches the robust shape value of the 3D sample in a case that the Hamming distance between the robust shape value of the 3D object and the robust shape value of the 3D sample is less than a first predetermined threshold; and the judging unit determines that the robust shape value of the 3D object does not match the robust shape value of the 3D sample in a case that the Hamming distance between the robust shape value of the 3D object and the robust shape value of the 3D sample is greater than or equal to the first predetermined threshold. In this way, it can be judged whether the 3D object matches each 3D sample. Here, the predetermined threshold value may be set according to actual requirements or empiric value.

According to the embodiment as described above, in a case that the matching unit 1112 determines that the 3D object matches one 3D sample, related information of the 3D sample such as a number and a model file of the 3D sample, may be notified to the determination unit 1113. Next, the determination unit 1113 may search the 3D sample database for a robust design value and description information of the 3D sample based on the related information of the 3D sample.

According to an embodiment of the present disclosure, the determination unit 1113 may determine, on the 3D object, an area corresponding to the specific area of the matched 3D sample as a specific area of the 3D object. As mentioned above, the description information of the record in the 3D sample database includes a shape description of the 3D sample, a shape description of the specific area, and description of a position of a specific area relative to the 3D sample. Hence, the determination unit 1113 may determine the specific area of the 3D sample. Furthermore, since the robust shape value of the 3D object matches the robust shape value of the 3D sample, a integral 3D shape of the 3D object is similar to a integral 3D shape of the 3D sample, thus it can de determined that an area corresponding to the specific area of the 3D sample on the 3D object is the specific area of the 3D object. For example, both the 3D object and the 3D sample are models of bunny, the specific area of the 3D sample is a mouth of the bunny, then the specific area of the 3D object is determined as the mouth of the bunny, which is a part corresponding to the mouth of the bunny of the 3D sample.

According to an embodiment of the present disclosure, after the specific area of the 3D object is determined, the determination unit 1113 may determine a robust design value of the 3D object based on a robust feature of a 3D shape of the specific area of the 3D object.

In the present disclosure, a method for defining and calculating the robust design value of the 3D object may be to the same as the method for defining and calculating the robust design value of the 3D sample as stated above. That is, the robust design value of the 3D sample includes a robust feature of a 3D shape of the specific area of the 3D sample. The robust design value of the 3D object includes the robust feature of the 3D shape of the specific area of the 3D object.

According to an embodiment of the present disclosure, the determination unit 1113 may also include a feature point determination unit, a robust feature determination unit and a quantizing unit (not shown). The feature point determination unit may determine feature points of the specific area of the 3D object based on a model file of the 3D object. The robust feature determination unit may determine a robust design feature of the 3D object based on the feature points of the specific area of the 3D object. The quantizing unit may quantize the robust design feature of the 3D object to generate the robust design value of the 3D object. According to an embodiment of the present disclosure, the robust value may be represented by a hash value. That is, the robust design value of the 3D object may include a robust design hash value of the 3D object.

According to an embodiment of the present disclosure, the robust design value of the 3D object may be generated using a global feature of the specific area of the 3D object, or may be generated using a local feature of the specific area of the 3D object.

Various embodiments of the robust value generation unit 111 in the apparatus 100 as stated above with regarding to generation of the robust design value of the 3D sample are all applicable to generation of the robust design value of the 3D object, which is not described repeatedly here.

Figure 12:
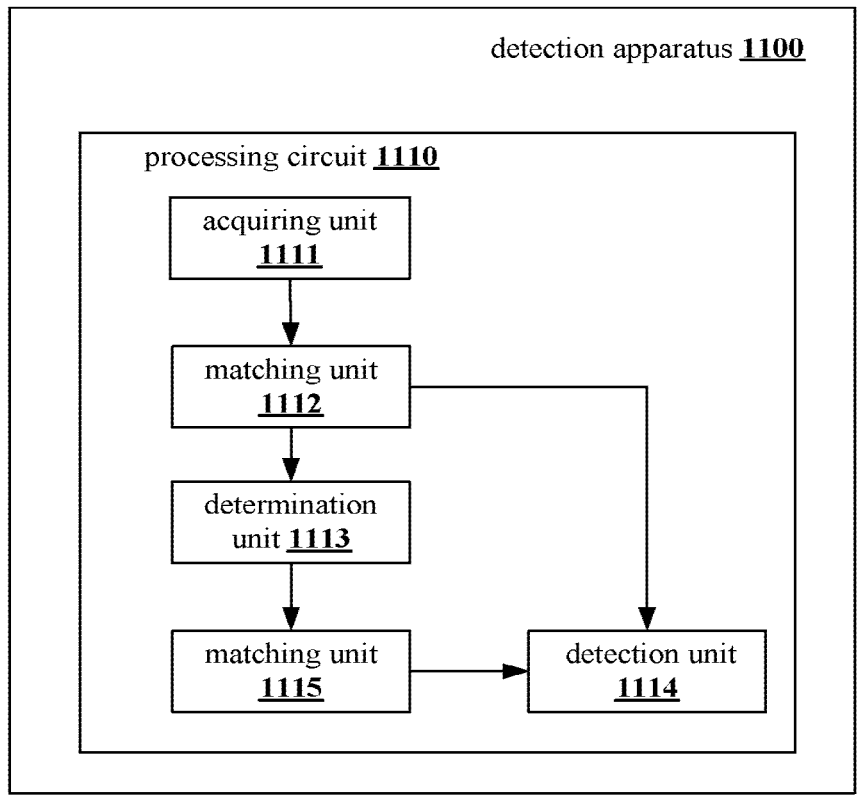
FIG. 12 is a block diagram of a structure of a 3D object detection apparatus according to an embodiment of the present disclosure.

FIG. 12 is a block diagram of a structure of a 3D object detection apparatus according to a further embodiment of the present disclosure. As shown in FIG. 12, in addition to the acquiring unit 1111, the matching unit 1112, the determination unit 1113 and the detection unit 1114 described above, the 3D object detection apparatus may further include a matching unit 1115.

According to an embodiment of the present disclosure, the matching unit 1115 may match the robust design value of the 3D object and the robust design value of the 3D sample. The 3D sample is the 3D sample whose robust shape value matches the robust shape value of the 3D object. According to an embodiment of the present disclosure, the matching unit 1115 may acquire the robust design value of the 3D object from the determination unit 1113, and may acquire the robust design value of the matched 3D sample from the 3D sample database, or may acquire the robust design value of the matched 3D sample from the determination unit 1113. Furthermore, the matching unit 1115 may match the robust design value of the 3D object with the matched robust design value of the 3D sample. Thus, the matching unit 1115 may determine a result of the matching. The result of the matching includes the result of the matching being positive, which indicates that the robust design value of the 3D object matches the robust design value of the 3D sample; or the result of the matching being negative, which indicates that the robust design value of the 3D object does not match the robust design value of the 3D sample.

According to an embodiment of the present disclosure, the matching unit 1115 may determine whether the robust design value of the 3D object matches the robust design value of the 3D sample by using a method similar to the matching unit 1112. That is, the matching unit 1115 may also include a calculation unit and a judging unit (not shown). The calculation unit may calculate a Hamming distance between the robust design value of the 3D object and the robust design value of the 3D sample. As mentioned above, the robust design value may include a robust design hash value, that is, the robust design value includes multiple bits. The calculation unit may perform exclusive-or operation on the robust design value of the 3D object and the robust design value of the 3D sample, and take the number of bits being 1 as the Hamming distance between the robust design value of the 3D object and the robust design value of the 3D sample. The calculation unit may transmit the Hamming distance to the judging unit. Next, the judging unit may determine whether the robust design value of the 3D object matches the robust design value of the 3D sample based on a result of comparing the Hamming distance with a predetermined threshold value. Specifically, the judging unit determines that the robust design value of the 3D object matches the robust design value of the 3D sample in a case that the Hamming distance between the robust design value of the 3D object and the robust design value of the 3D sample is less than a second predetermined threshold value; or the judging unit determines that the robust design value of the 3D object does not match the robust design value of the 3D sample in a case that the Hamming distance between the robust design value of the 3D object and the robust design value of the 3D sample is greater than or equal to a second predetermined threshold value. Here, the predetermined threshold value may be set according to actual requirements or empiric value.

In the embodiment, the detection unit 1114 may further detect the 3D object based on a result of the matching the robust shape value and a result of the matching the robust design value.

According to an embodiment of the present disclosure, detecting the 3D object by the detection unit 1114 may include determining whether the 3D object is derived from the 3D sample in the 3D sample database. For example, it is detected whether the 3D object is a piracy or a fake of the 3D sample in the 3D sample database, or whether the 3D object is an object which is prohibited from 3D printing for some reason, for example, contraband such as a gun, or human organs contrary to the law of the state.

According to an embodiment of the present disclosure, the detection unit 1114 may determine whether the 3D object is derived from the 3D sample in the 3D sample database by determining that the 3D object is derived from the matched 3D sample in the 3D sample database in a case that the matching unit 1115 determines that the result of the matching the robust design value is positive; or determining that the 3D object is not derived from the matched 3D sample in the 3D sample database in a case that the matching unit 1115 determines that the result of the matching the robust design value is negative or the matching unit 1112 determines that the result of the matching the robust shape value is negative.

As described above, in the embodiment, the robust shape value of the 3D object may be matched with the robust shape value of the 3D sample in the 3D sample database when detecting the 3D object. The robust design value of the 3D sample is matched with the robust design value of the 3D object if the robust shape value of the 3D object matches the robust shape value of the 3D sample in the 3D sample database. It is determined that the 3D object is derived from the 3D sample only if the robust shape value of the 3D object matches the robust shape value of the 3D sample in the 3D sample database. Since the robust design value of the 3D sample includes the robust feature of the 3D shape of the specific area of the 3D sample, in this case, the 3D object can be detected only based on the robust shape value and the robust design value of the 3D object without embedding a watermark into the 3D sample, thereby performing intellectual property protection on the 3D sample in the 3D sample database becomes easier.

Figure 13:
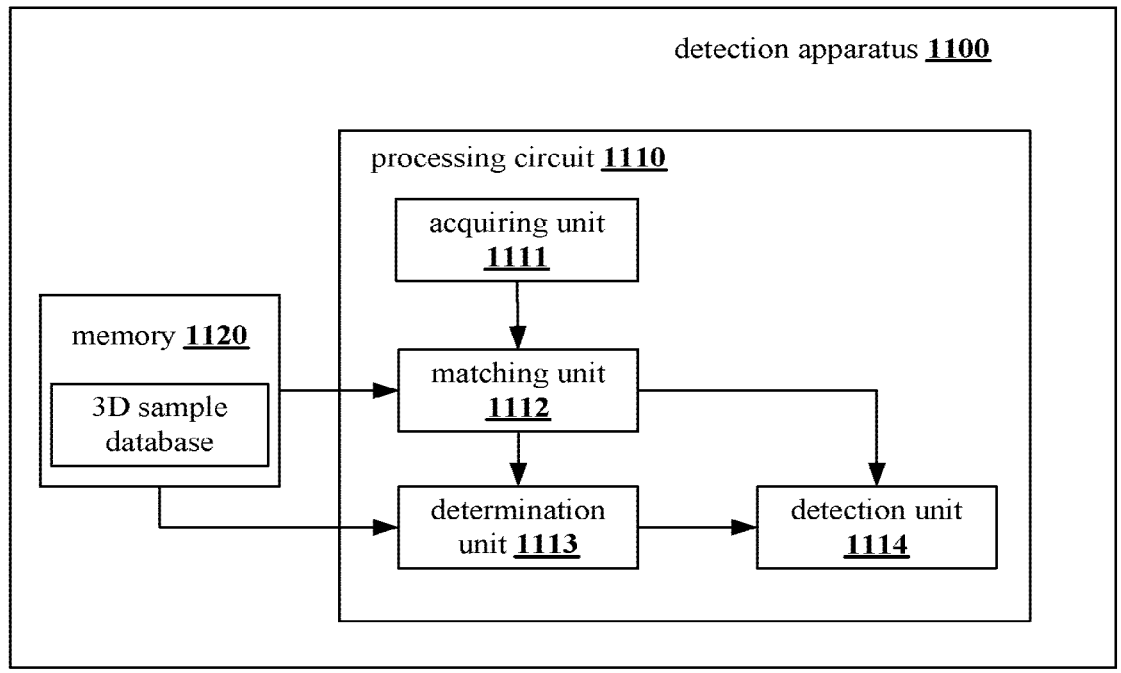
FIG. 13 is a block diagram of a structure of a 3D object detection apparatus according to a further embodiment of the present disclosure.

FIG. 13 is a block diagram of a structure of a 3D object detection apparatus according to a further embodiment of the present disclosure. As shown in FIG. 13, in addition to the acquiring unit 1111, the matching unit 1112, the determination unit 1113 and the detection unit 1114 described above, the 3D object detection apparatus 1100 may further include a memory 1120 for storing the 3D sample database.

In the embodiment, the matching unit 1112 may acquire the robust shape value of the 3D sample from the 3D sample database on the memory 1120, and the determination unit 1113 may acquire the robust design value and description information of the 3D sample from the 3D sample database on the memory 1120, thereby realizing each function.

In the embodiment, the processing unit 1110 of the detection apparatus 1100 may further include a matching unit 1115. In such an embodiment, the matching unit 1115 may acquire the robust design value of the 3D sample from the determination unit 1113, or may acquire the robust design value of the 3D sample from the 3D sample database in the memory 1120 directly, thereby realizing the function thereof.

In the embodiment, the detection apparatus 1100 includes the memory 1120 so that the 3D sample database is located locally, and each unit of the processing circuit 1110 may acquire various information of the 3D sample database from the memory 1120 directly, which is very convenient.

Figure 14:
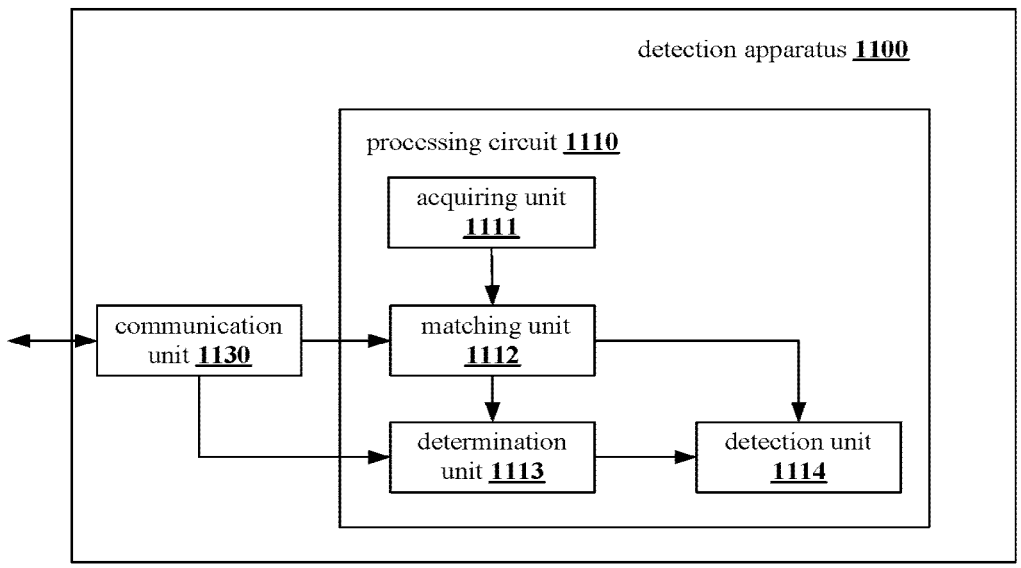
FIG. 14 is a block diagram of a structure of a 3D object detection apparatus according to a further embodiment of the present disclosure.

FIG. 14 is a block diagram of a structure of a 3D object detection apparatus according to a further embodiment of the present disclosure. As shown in FIG. 14, in addition to the acquiring unit 1111, the matching unit 1112, the determination unit 1113 and the detection unit 1114 described above, the detection apparatus 1100 may further include a communication unit 1130 for acquiring the 3D sample database from other apparatus. Here, the communication unit 1130 may function as a transceiver and may communicate with the 3D sample database stored in other apparatus via a network.

In the embodiment, the matching unit 1112 may acquire the robust shape value of the 3D sample from the 3D sample database via the communication unit 1130, and the determination unit 1113 may acquire the robust design value and description information of the 3D sample from the 3D sample database via the communication unit 1130, thereby realizing each function.

In the embodiment, the processing unit 1110 of the detection apparatus 1100 may further include the matching unit 1115. In such embodiment, the matching unit 1115 may acquire the robust design value of the 3D sample from the determination unit 1113, or may acquire the robust design value of the 3D sample from the 3D sample database directly, thereby realizing the function.

In the embodiment, the detection apparatus 1100 includes the communication unit 1130 for communicating with the 3D sample database via the network so that the 3D sample database is located in other dedicated apparatus, thereby managing the 3D sample database better, and the apparatus 1100 only has a function of detecting the 3D object rather than storing the 3D sample database so that the apparatus 1100 may be miniaturized and portable.

Fourth Embodiment

Figure 15:
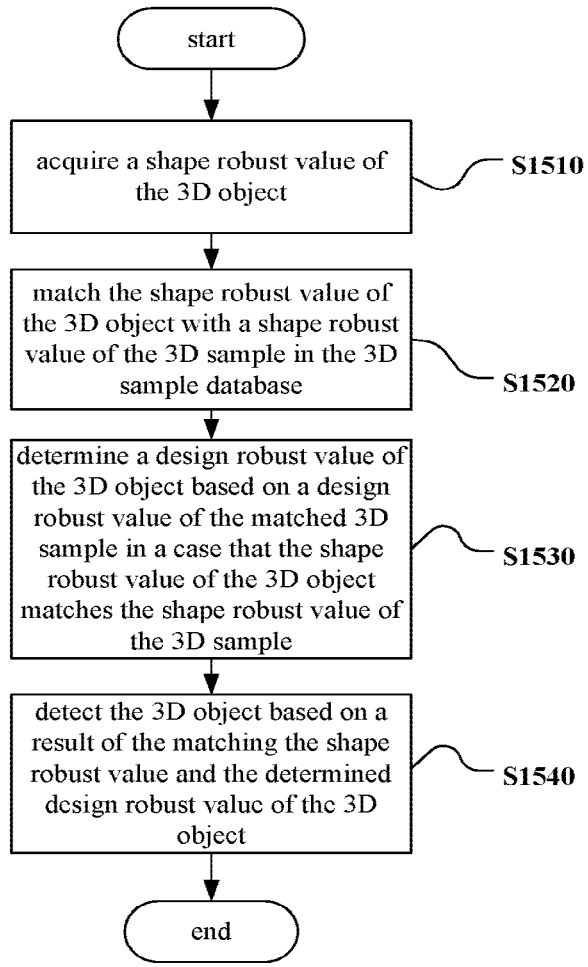
FIG. 15 is a flowchart of a 3D object detection method according to an embodiment of the present disclosure.

In the embodiment, a 3D object detection method is provided. FIG. 15 is a flowchart of a 3D object detection method according to an embodiment of the present disclosure.

As shown in FIG. 15, firstly, in step S1510, a robust shape value of the 3D object is acquired.

Next, in step S1520, the robust shape value of the 3D object is matched with the robust shape value of the 3D sample in the 3D sample database. The robust shape value of the 3D object includes a robust feature of a integral 3D shape of the 3D object, and the robust shape value of the 3D sample includes a robust feature of a integral 3D shape of the 3D sample.

Next, in step S1530, a robust design value of the 3D object is determined based on a robust design value of the matched 3D sample in a case that the robust shape value of the 3D object matches the robust shape value of the 3D sample.

Next, in step S1540, the 3D object is detected based on a result of the matching the robust shape value and the determined robust design value of the 3D object.

Preferably, the robust shape value of the 3D object may be generated using a global feature of the 3D object.

Preferably, the robust shape value of the 3D object may be generated using a local feature of the 3D object.

Preferably, the matching the robust shape value of the 3D object with the robust shape value of the 3D sample may include calculating a Hamming distance between the robust shape value of the 3D object and the robust shape value of the 3D sample; and determining that the robust shape value of the 3D object matches the robust shape value of the 3D sample in a case that the Hamming distance is less than a first predetermined threshold value.

Preferably, the robust design value of the 3D sample may include a robust feature of a 3D shape of a specific area of the 3D sample.

Preferably, the determining the robust design value of the 3D object based on the robust design value of the matched 3D sample may include determining, on the 3D object, an area corresponding to the specific area of the matched 3D sample as a specific area of the 3D object; and determining the robust design value of the 3D object based on the robust feature of the 3D shape of the specific area of the 3D object.

Preferably, the method may further include matching the robust design value of the 3D object with the robust design value of the 3D sample, and detecting the 3D object based on the result of the matching the robust shape value and a result of the matching the robust design value.

Preferably, the matching the robust design value of the 3D object with the robust design value of the 3D sample may include calculating a Hamming distance between the robust design value of the 3D object and the robust design value of the 3D sample; and determining that the robust design value of the 3D object matches the robust design value of the 3D sample in a case that the Hamming distance is less than a second predetermined threshold.

Preferably, the detecting the 3D object based on the result of the matching the robust shape value and the result of the matching the robust design value may include determining whether the 3D object is derived from a 3D sample in the 3D sample database.

Preferably, the determining whether the 3D object is derived from the 3D sample in the 3D sample database may include determining that the 3D object is derived from the 3D sample in the 3D sample database if the result of the matching the robust design value is positive; or determining that the 3D object is not derived from the 3D sample in the 3D sample database if the result of the matching the robust shape value or the result of the matching the robust design value is negative.

Preferably, the 3D sample database may be stored locally.

Preferably, the method may further include communicating with the 3D sample database via a network.

In this embodiment, the apparatus for performing the 3D object detection method may be the apparatus 1100 in the third embodiment, hence, all the various embodiments described in the third embodiment are applied hereto. That is, various specific embodiments of each of the above-described steps of performing the 3D object detection method database according to an embodiment of the present disclosure have been described in detail with respect to the 3D object detection apparatus 1100 described above, which is not described repeatedly here.

Fifth Embodiment

Figure 16:
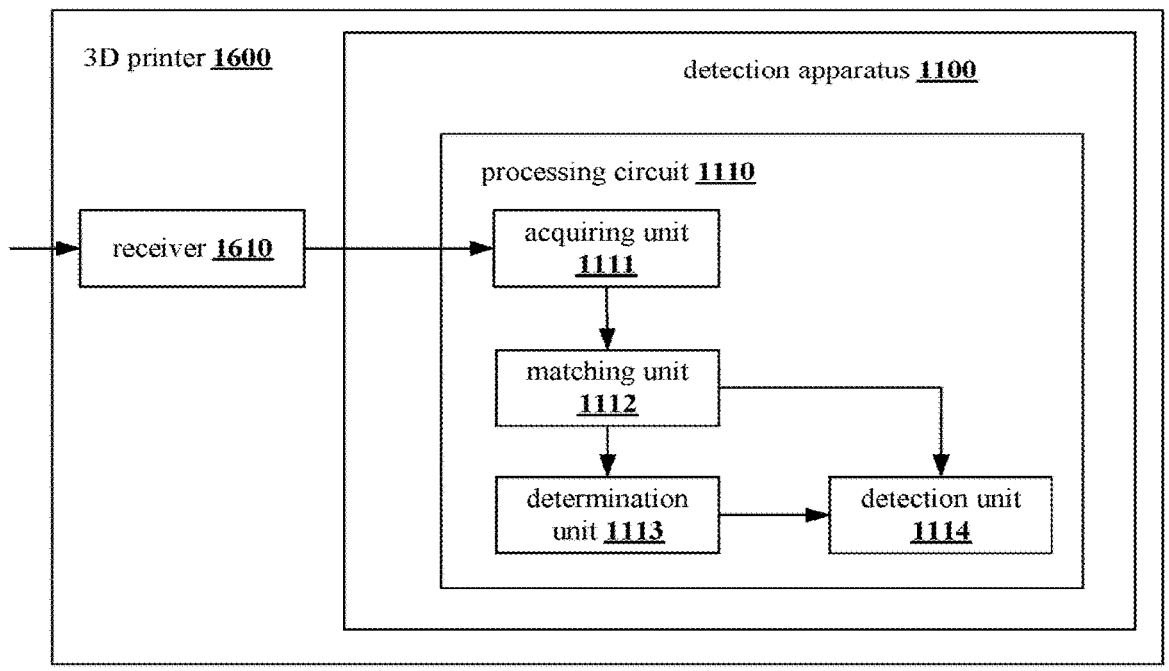
FIG. 16 is a block diagram of a structure of a 3D printer according to an embodiment of the present disclosure.

A 3D printer is provided in the embodiment. FIG. 16 is a block diagram of a structure of a 3D printer according to an embodiment of the present disclosure.

As shown in FIG. 16, the 3D printer 1600 includes a receiver 1610 and a 3D object detection apparatus 1100.

According to an embodiment of the present disclosure, the receiver 1610 may receive a model file of the 3D object. Here, the 3D object may be any 3D entity with a three-dimension structure on which 3D printing is needed or expected to be performed. Furthermore, the model file of the 3D object includes any information required for printing the 3D object, and upon reception of the model file of the 3D object, the receiver 1610 may transmit the model file of the 3D object to the 3D object detection apparatus 1100 for detecting the 3D object by the 3D object detection apparatus 1100. Specifically, the receiver 1610 may transmit the model file of the 3D object to the acquiring unit 1111 of the processing circuit 1110 of the 3D object detection apparatus 1100. Next, the acquiring unit 1111 may acquire the robust shape value of the 3D object based on the model file of the 3D object so that other units of the 3D detection apparatus 1100 performs a corresponding operation.

According to an embodiment of the present disclosure, the 3D object detection apparatus 1100 may be the 3D object detection apparatus 1100 in various embodiments in the third embodiment. Hence, various embodiments described in the third embodiment are all applicable to the 3D object detection apparatus 1100 here.

According to an embodiment of the present disclosure, the 3D printer 1600 may further include a 3D printing unit (not shown) for performing 3D printing on the 3D object based on a result of detecting by the 3D object detection apparatus 1100.

According to an embodiment of the present disclosure, the printing unit may perform 3D printing on the 3D object in a case that the detection unit 1114 of the 3D object detection apparatus 1100 determines that the 3D object is not derived from the 3D sample in the 3D sample database. Furthermore, the printing unit does not perform 3D printing on the 3D object in a case that the detection unit 1114 of the 3D object detection apparatus 1100 determines that the 3D object is derived from the 3D sample in the 3D sample database.

According to an embodiment of the present disclosure, before performing 3D printing on the 3D object, the 3D object needed to be printed may be detected firstly, a printing function is performed only if the 3D object is not derived from the 3D sample in the 3D sample database. In this way, it is avoided that the piracy and fake are printed, thereby realizing the intellectual property protection for the 3D sample in the 3D sample database.

Sixth Embodiment

Figure 17:
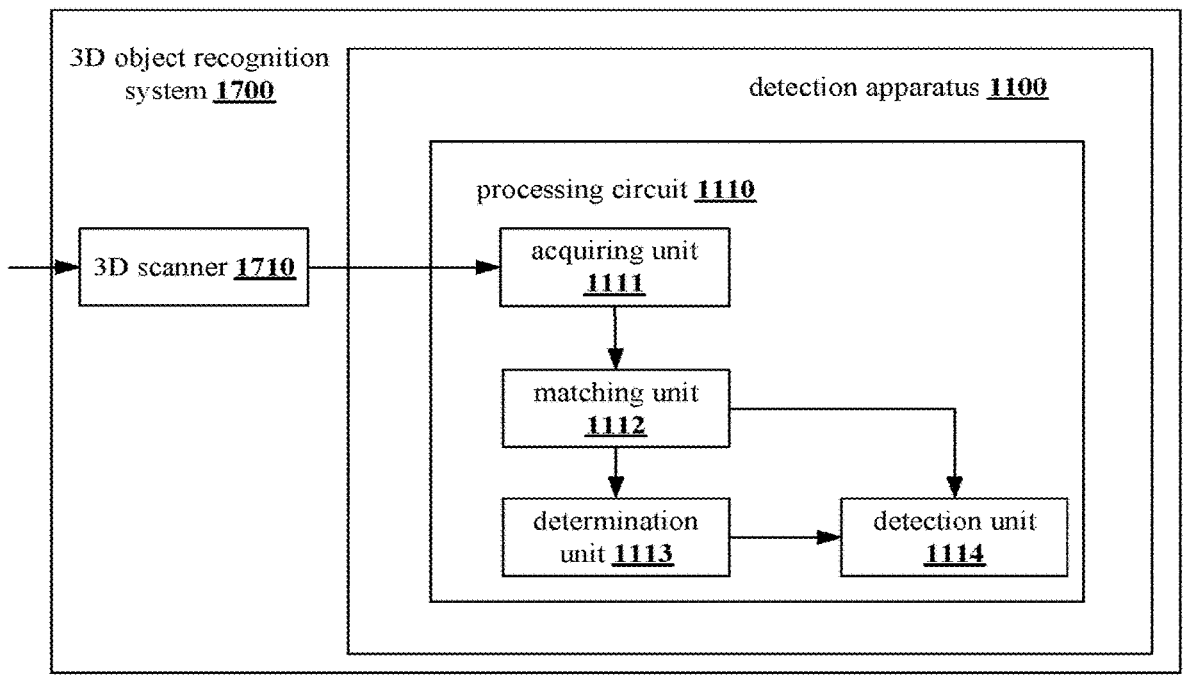
FIG. 17 is a block diagram of a structure of a 3D object recognition system according to an embodiment of the present disclosure.

A 3D object recognition system is provided in the embodiment. FIG. 17 is a block diagram of a structure of a 3D object recognition system according to an embodiment of the present disclosure.

As shown in FIG. 17, a 3D object recognition system 1700 includes a 3D scanner 1710 and a 3D object detection apparatus 1100.

According to an embodiment of the present disclosure, the 3D scanner 1710 may scan a 3D object to obtain a model file of the 3D object. The 3D scanner 1710 may be any 3D scanner well known in the art, and may perform 3D scanning by using any technology well known in the art. Similarly, the 3D object may be any 3D entity with a three-dimension structure on which 3D printing is needed or expected to be performed. Furthermore, the model file of the 3D object includes any information required for printing the 3D object. After the 3D scanner 1710 obtains the model file of the 3D object by scanning, the 3D scanner 1710 may transmit the model file of the 3D object to the 3D object detection apparatus 1100 for detecting the 3D object by the 3D object detection apparatus 1100. Specifically, the 3D scanner 1710 may transmit the model file of the 3D object to the acquiring unit 1111 of the processing circuit 1110 of the 3D object detection apparatus 1100. Next, the acquiring unit 1111 may acquire the robust shape value of the 3D object based on the model file of the 3D object so that other unit of the 3D detection apparatus performs a corresponding operation.

According to an embodiment of the present disclosure, the 3D object detection apparatus 1100 may be the 3D object detection apparatus 1100 in various embodiments in the third embodiment. Hence, various embodiments described in the third embodiment are all applicable to the 3D object detection apparatus 1100 here.

According to the embodiment of the present disclosure, the 3D object recognition system may be used to determine whether the 3D object is derived from the 3D sample in the 3D sample database. Since the system includes the 3D scanner, a result indicating whether a 3D object is derived from the 3D sample in the 3D sample database can be outputted by only inputting one 3D object, which is simple and convenient.

According to an embodiment of the present disclosure, the 3D object recognition system 1700 may further include a 3D printer for performing 3D printing on the 3D object based on a result of detecting by the 3D object detection apparatus 1100. For example, 3D printing is performed on the 3D object in a case that the detection unit 1114 of the 3D object detection apparatus 1100 determines that the 3D object is not derived from the 3D sample of the 3D sample database. Furthermore, 3D printing is not performed on the 3D object in a case that the detection unit 1114 of the 3D object detection apparatus 1100 determines that the 3D object is derived from the 3D sample of the 3D sample database.

According to the embodiment of the present disclosure, the 3D object recognition system can determine whether the 3D object is derived from the 3D sample in the 3D sample database, and can perform the printing function on the 3D object not derived from the 3D sample in the 3D sample database directly, integrating multiple function into one system.

Seventh Embodiment

Figure 18:
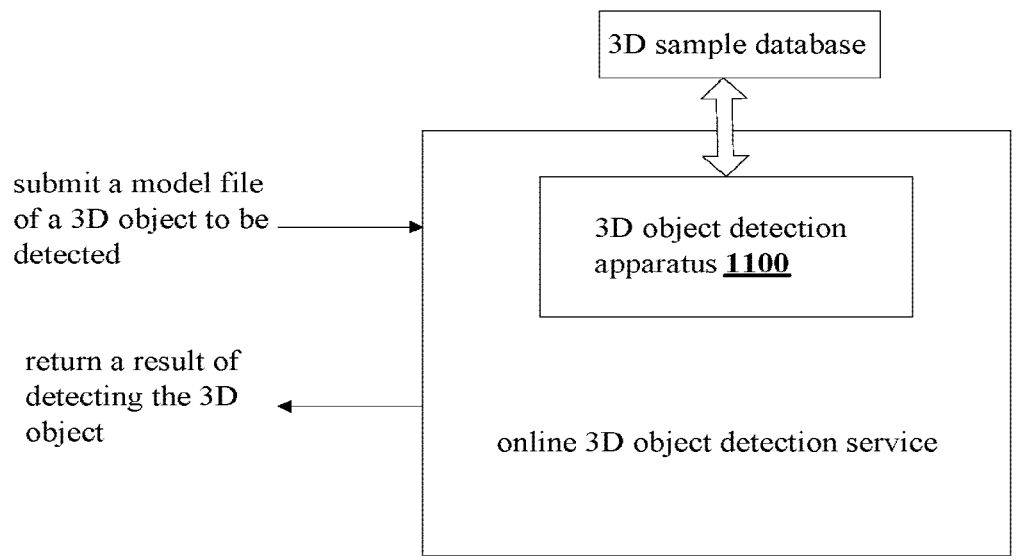
FIG. 18 is a schematic diagram of a process of providing online 3D object detection service according to an embodiment of the present disclosure.

In the embodiment, a schematic diagram of a process of providing online 3D object detection service is provided. FIG. 18 is a schematic diagram of a process of providing the online 3D object detection service. As shown in FIG. 18, firstly, a user submits a model file of a 3D object to be detected to a server. According to an embodiment of the present disclosure, the user may acquire the model file of the 3D object directly and submit the model file of the 3D object to the server, or the user may acquire the model file of the 3D object by a manner of scanning the 3D object. The 3D object detection device 1100 is stored on the server for detecting the 3D object based on the model file of the 3D object which is submitted by the user. The 3D object detection apparatus 1100 here may be the 3D object detection apparatus 1100 according to various embodiments in the third embodiment. Next, the 3D object detection apparatus 1100 returns a result of detecting after determining the result of detecting. The result of detecting here may include a result indicating whether the 3D object is derived from the 3D sample database, and in a case that the 3D object is derived from the 3D sample in the 3D sample database, the result of detecting may further include information on the matched 3D sample to notify the user of which 3D sample matches the 3D object.

According to the embodiment of the present disclosure, the user may determine whether the 3D object is derived from the 3D sample in the 3D sample database by acquiring the model file of the 3D object with the online service, such as whether the 3D object is a piracy or fake of the 3D sample in the 3D sample database.

Eighth Embodiment

Figure 19:
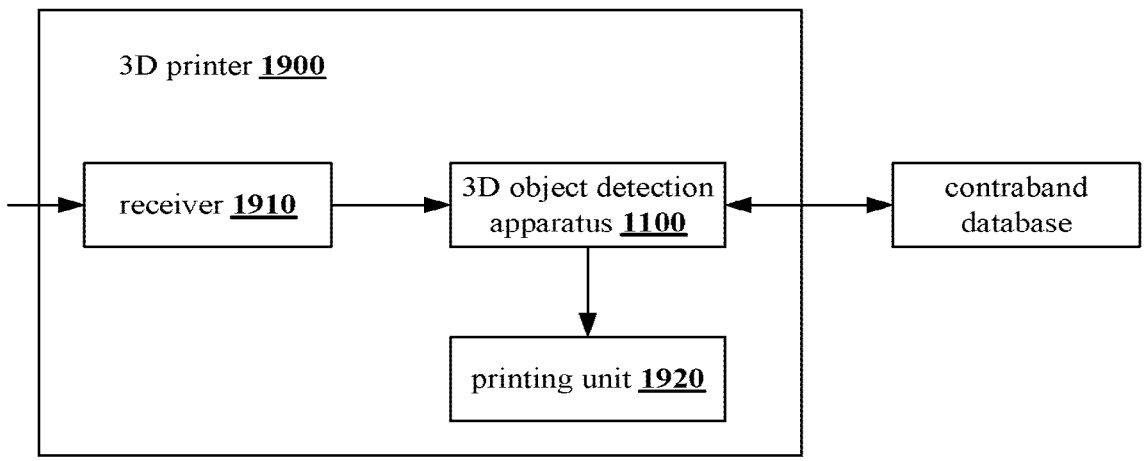
FIG. 19 is a block diagram of a structure of a 3D printer for identifying contraband according to an embodiment of the present disclosure.
Figure 20:
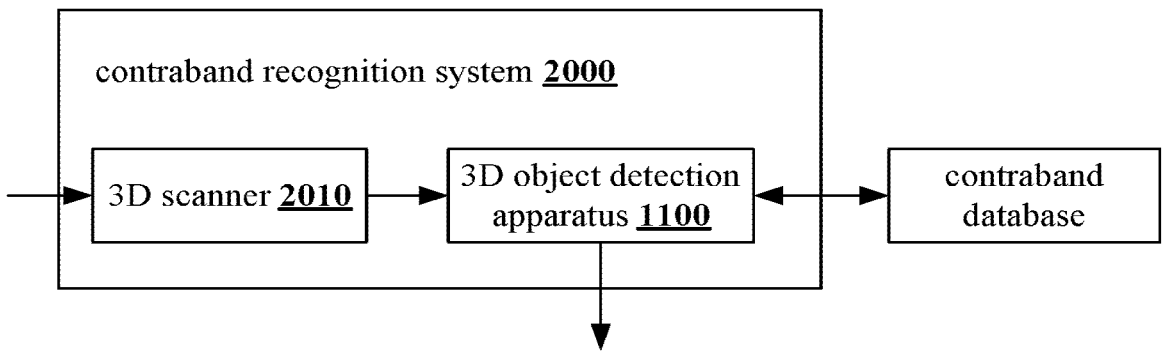
FIG. 20 is a block diagram of a structure of a contraband recognition system according to an embodiment of the present disclosure.

In the embodiment, a 3D printer for identifying contraband and a contraband recognition system are provided. FIG. 19 is a block diagram of a structure of a 3D printer for identifying contraband according to an embodiment of the present disclosure, and FIG. 20 is a block diagram of a structure of a contraband recognition system according to an embodiment of the present disclosure.

As shown in FIG. 19, a 3D printer 1900 includes a receiver 1910, a printing unit 1920 and a 3D object detection apparatus 1100.

According to an embodiment of the present disclosure, the receiver 1910 is used to receive a model file of the 3D object. Here, the 3D object may be any 3D entity with a three-dimension structure on which 3D printing is needed or expected to be performed. Furthermore, the model file of the 3D object includes any information required for printing the 3D object, and upon reception of the model file of the 3D object, the receiver 1910 may transmit the model file of the 3D object to the 3D object detection apparatus 1100 for detecting the 3D object by the 3D object detection apparatus 1100.

According to an embodiment of the present disclosure, the 3D object detection apparatus 1100 may be the 3D object detection apparatus 1100 in various embodiments in the third embodiment. Hence, various embodiments described in the third embodiment are all applicable to the 3D object detection apparatus 1100 here. In the embodiment, the 3D sample database stores a record of contraband. The contraband may be a body prohibited from unauthorized 3D printing for some reason, for example, contraband such as a gun, or human organs contrary to the law of the state. The 3D object detection apparatus 1100 may detect whether the 3D object is derived from a contraband database, which is similar to the case in the third embodiment in which the detection apparatus 1100 detects whether the 3D object is derived from the 3D sample database, which is not described repeatedly.

According to an embodiment of the present disclosure, the printing unit 1920 may perform 3D printing on the 3D object based on a result of detecting by the 3D object detection apparatus 1100. For example, 3D printing is performed on the 3D object in a case that the 3D object detection apparatus 1100 determines that the 3D object is not derived the contraband database. Furthermore, 3D printing is not performed on the 3D object in a case that the 3D object detection apparatus 1100 determines that the 3D object is derived from the contraband database.

According to an embodiment of the present disclosure, before performing 3D printing on the 3D object, the 3D object needed to be printed may be detected firstly, and a printing function is performed only if the 3D object is not the contraband. In this way, it is avoided that contraband is printed in unauthorized way. Since the robust design value includes the robust feature of the 3D shape of the specific area of the 3D sample, it can avoid false detection of an article such as a toy gun.

As shown in FIG. 20, the contraband recognition system 2000 according to an embodiment of the present disclosure may include a 3D scanner 2010 and a 3D object detection apparatus 1100.

According to an embodiment of the present disclosure, the 3D scanner 2010 may scan a 3D object to obtain a model file of the 3D object. The 3D scanner 2010 may be any 3D scanner well known in the art, and may perform 3D scanning by using any technology well known in the art. Similarly, the 3D object may be any 3D entity with a three-dimension structure on which 3D printing is needed or expected to be performed. Furthermore, the model file of the 3D object includes any information required for printing the 3D object, after obtaining the model file of the 3D object by scanning, the 3D scanner 2010 may transmit the model file of the 3D object to the 3D object detection apparatus 1100 for detecting the 3D object by the 3D object detection apparatus 1100.

According to an embodiment of the present disclosure, the 3D object detection apparatus 1100 may be the 3D object detection apparatus 1100 in various embodiments in the third embodiment. Hence, various embodiments described in the third embodiment are all applicable to the 3D object detection apparatus 1100 here. Similar to the embodiment as shown in FIG. 19, in the embodiment as shown in FIG. 20, the 3D object detection apparatus 1100 may detect whether the 3D object is derived from a contraband database, which is similar to the case in the third embodiment in which the detection apparatus 1100 detects whether the 3D object is derived from the 3D sample database, which is not described repeatedly.

According to the embodiment of the present disclosure, the 3D object recognition system 2000 may be used to determine whether the 3D object is derived from the contraband database. Since the system includes the 3D scanner, it can be determined whether a 3D object is contraband by only inputting one 3D object, which is simple and convenient. Since the robust design value includes the robust feature of the 3D shape of the specific area of the 3D sample, it can avoid false detection of an article such as a toy gun.

In the embodiments as described above, the apparatus and the method for establishing the 3D database, the 3D object detection apparatus and method, the 3D printer, the 3D object recognition system, the online 3D object detection service and the contraband recognition system are described in an exemplary manner. However, the apparatus and the method described in the present disclosure may further be applied in other aspect to solve a security problem of intellectual property protection, for example, identification of trademark, shape identification of a utility model, construction identification of an invention and shape and color identification of design. With the invention, a body to be detected can be detected, and intellectual property protection is performed on intellectual property content in different types.

In the system and the method according to the present disclosure, apparently, the various steps or steps can be decomposed and/or recombined. These decomposition and/or recombination should be deemed as the equivalent solution of the disclosure. The steps for performing the above processes may be executed naturally in the description order in a chronological order, but is not necessarily to be executed in the chronological order. Some of the steps may be executed in parallel or separately.

Although the embodiments of the disclosure are introduced in detail above in conjunction with the drawings, the described embodiments are only to describe the disclosure but not to limit the disclosure. In addition, those skilled in the art may make changes to the specific embodiments and the application scope based on the above embodiments. Thus, the scope of the disclosure is only defined by the appended claims and its equivalents.

The invention claimed is:

1. A 3D object detection apparatus, comprising:
one or more processing circuits configured to
acquire a first value of the 3D object related to a whole shape of the 3D object, the first value of the 3D object being determined based on a model file of the 3D object;
determine the first value of the 3D object matches with a second value of a 3D sample stored in a 3D sample database, the second value of the 3D sample being determined based on a plurality of feature points of a 3D shape of the 3D sample;
determine whether a third value of the 3D object related to a specific area of the 3D object matches with a fourth value of the 3D sample related to corresponding specific area of the 3D sample which is stored in the 3D sample database, the specific area of the 3D sample being specified by a manufacturer of the 3D sample in association with a special shape of the 3D sample, without embedding a 3D watermark or specific surface texture into the 3D sample, to protect intellectual property rights of the 3D sample, in a case that the first value of the 3D object matches with the second value of the 3D sample; and
detect the 3D object based on both of a result of the matching process of the first and the second values and the matching process of the third and the fourth values.

2. The apparatus according to claim 1, wherein the processing circuit is further configured to generate the first value of the 3D object using a global feature of the 3D object.

3. The apparatus according to claim 1, wherein the processing circuit is further configured to generate the first value of the 3D object using a local feature of the 3D object.

4. The apparatus according to claim 1, wherein when matching the first value of the 3D object with the second value of the 3D sample, the processing circuit is further configured to
calculate a Hamming distance between the first value of the 3D object and the second value of the 3D sample; and
determine that the first value of the 3D object matches the second value of the 3D sample in a case that the Hamming distance is less than a first predetermined threshold.

5. The apparatus according to claim 1, wherein the specific area of the 3D sample is at least one of an area of specific shape of the 3D sample, an area carrying a trademark of the 3D sample, and an area representing characteristics of the 3D sample.

6. The apparatus according to claim 5, wherein when determining the third value of the 3D object based on the fourth value of the matched 3D sample, the processing circuit is further configured to
determine, on the 3D object, an area corresponding to the specific area of the matched 3D sample as a specific area of the 3D object; and
determine the third value of the 3D object based on the feature of the 3D shape of the specific area of the 3D object.

7. The apparatus according to claim 1, wherein when matching the third value of the 3D object with the fourth value of the 3D sample, the processing circuit is further configured to
calculate a Hamming distance between the third value of the 3D object and the fourth value of the 3D sample; and
determine that the third value of the 3D object matches the fourth value of the 3D sample in a case that the Hamming distance is less than a second predetermined threshold.

8. The apparatus according to claim 1, wherein when detecting the 3D object based on both of the result of the matching process of the first and the second values and the matching process of the third and the fourth values, the processing circuit is further configured to determine whether the 3D object is derived from a 3D sample in the 3D sample database.

9. The apparatus according to claim 8, Wherein when determining whether the 3D object is derived from the 3D sample in the 3D sample database, the processing circuit is further configured to
determine that the 3D object is derived from the 3D sample in the 3D sample database if the result of the matching the third and the fourth values is positive; or
determine that the 3D object is not derived from the 3D sample in the 3D sample database if the result of the matching the first and the second values or the result of the matching the third and the fourth values is negative.

10. The apparatus according to claim 1, further comprising a memory configured to store the 3D sample database thereon.

11. The apparatus according to claim 1, further comprising a transceiver configured to communicate with the 3D sample database via a network.

12. A 3D printer, comprising:
a receiver configured to receive the model file of the 3D object; and
the 3D object detection apparatus according to claim 1 configured to detect the 3D object based on the model file of the 3D object.

13. A 3D object recognition system, comprising:
a 3D scanner configured to scan the 3D object to obtain the model file of the 3D object; and
the 3D object detection apparatus according to claim 1 configured to detect the 3D object based on the model file of the 3D object.

14. The apparatus according to claim 1, wherein the processing circuit is further configured to calculate the second value based on a distance value between two feature points of the plurality of feature points of the 3D sample and a distribution function of the distance value.

15. The apparatus according to claim 1, wherein the first value indicates robustness under transformation operation including at least one of a non-rigid transformation, a topic transformation, a local scale transformation, a global scale transformation, a transformation with a hole on surface, a transformation with a shot noise, and a down sampling transformation.

16. A method for establishing a 3D sample database, comprising:
generating, based on a 3D sample, a first shape value of the 3D sample and a second shape value of the 3D sample, wherein the first shape value of the 3D sample being determined based on a plurality of feature points of a 3D shape of the 3D sample, and the second shape value of the 3D sample comprises a feature of a 3D shape of a specific area of the 3D sample, the specific area of the 3D sample being specified by a manufacturer of the 3D sample in association with a special shape of the 3D sample, without embedding a 3D watermark or specific surface texture into the 3D sample;

generating a record of the 3D sample based on the 3D sample, the first shape value of the 3D sample and the second shape value of the 3D sample, wherein the first shape value is used for determination of matching with other first shape value of a 3D object and the second shape value is used for determination of matching with other second shape value of corresponding specific area of the 3D object, in a case that the first shape value matches with the other first shape value of the 3D object; and storing the generated record into the 3D sample database.

17. The method according to claim 16, wherein the first shape value of the 3D sample is generated using a global feature of the 3D sample.

18. The method according to claim 16, wherein the first shape value of the 3D sample is generated using a local feature of the 3D sample.

19. An apparatus for establishing a 3D sample database to detect a 3D object, comprising:

one or more processing circuits configured to generate, based on a 3D sample, a first shape value of the 3D sample and a second shape value of the 3D sample, wherein the first shape value of the 3D sample being determined based on a plurality of feature points of a 3D shape of the 3D sample, and the second shape value of the 3D sample comprises a feature of a 3D shape of a specific area of the 3D sample, the specific area of the 3D sample being specified by a manufacturer of the 3D sample in association with a special shape of the 3D sample, without embedding a 3D watermark or specific surface texture into the 3D sample;

generate a record of the 3D sample based on the 3D sample, the first shape value of the 3D sample and the second shape value of the 3D sample, wherein the first shape value is used for determination of matching with other first shape value of a 3D object and the second shape value is used for determination of matching with other second shape value of corresponding specific area of the 3D object, in a case that the first shape value matches with the other first shape value of the 3D object; and store the generated record into the 3D sample database.

20. A 3D object detection method, comprising:

acquiring a first value of the 3D object related to a whole shape of the 3D object, the first value of the 3D object being determined based on a model file of the 3D object;

determining whether the first value of the 3D object matches with a second value of a 3D sample in a 3D sample database, the second value of the 3D sample being determined based on a plurality of feature points of a 3D shape of the 3D sample;

determining whether a third value of the 3D object related to a specific area of the 3D object matches with a fourth value of the 3D sample related to corresponding specific area of the 3D sample which is stored in the 3D sample database, the specific area of the 3D sample being specified by a manufacturer of the 3D sample in association with a special shape of the 3D sample, without embedding a 3D watermark or specific surface texture into the 3D sample, in a case that the first value of the 3D object matches with the second value of the 3D sample; and detecting the 3D object based on both of a result of the matching process of the first and the second values and the matching process of the third and the fourth values.

* * * * *